United States Patent
Koide et al.

[11] Patent Number: 5,934,395
[45] Date of Patent: Aug. 10, 1999

[54] HYBRID VEHICLE DRIVE SYSTEM HAVING TWO MOTOR/GENERATOR UNITS AND ENGINE STARTING MEANS

[75] Inventors: Takeharu Koide, Toyota; Hideaki Matsui, Aichi-ken; Mitsuhiro Nada, Toyota, all of Japan

[73] Assignee: Toyota Jidosha Kabushiki Kaisha, Toyota-shi, Japan

[21] Appl. No.: 08/730,762

[22] Filed: Oct. 15, 1996

[30] Foreign Application Priority Data

| Oct. 18, 1995 | [JP] | Japan | 7-268922 |
| Sep. 5, 1996 | [JP] | Japan | 8-235063 |

[51] Int. Cl.$^6$ .................................................. B60K 6/04
[52] U.S. Cl. ............................................................ 180/65.2
[58] Field of Search .................................. 180/65.2, 65.3, 180/65.4, 65.6; 123/3

[56] References Cited

U.S. PATENT DOCUMENTS

| 4,095,664 | 6/1978 | Bray | 180/65.4 |
| 4,319,140 | 3/1982 | Paschke | 290/45 |
| 4,335,429 | 6/1982 | Kawakatsu | 180/65.2 |
| 4,407,132 | 10/1983 | Kawakatsu et al. | 180/65.4 |
| 5,343,970 | 9/1994 | Severinsky | 180/65.6 |
| 5,492,189 | 2/1996 | Kriegler et al. | 180/65.2 |
| 5,558,173 | 9/1996 | Sherman | 180/65.4 |
| 5,558,175 | 9/1996 | Sherman | 180/65.2 |
| 5,562,566 | 10/1996 | Yang | 180/65.2 |
| 5,713,425 | 2/1998 | Buschhaus et al. | 180/65.4 |

FOREIGN PATENT DOCUMENTS

| 0-528-412-A1 | 2/1993 | European Pat. Off. . |
| A-0-552-140 | 7/1993 | European Pat. Off. . |
| 31-40-492-A1 | 6/1982 | Germany . |
| A-50-30223 | 3/1975 | Japan . |
| A-3-273933 | 12/1991 | Japan . |
| A-5-319110 | 12/1993 | Japan . |
| A-7-172196 | 7/1995 | Japan . |

*Primary Examiner*—J. J. Swann
*Assistant Examiner*—Frank Vanaman
*Attorney, Agent, or Firm*—Oliff & Berridge, PLC

[57] ABSTRACT

A hybrid drive system for a motor vehicle, including an engine operated by combustion of a fuel, a first motor/generator, a distributing mechanism for mechanically distributing an output of the engine to the first motor/generator and an output member, a second motor/generator whose rotary force is transferred to a power transmitting path between the output member and a drive wheel of the motor vehicle, and wherein an engine starting device is provided for operating the first motor/generator to crank the engine through the distributing mechanism, for thereby starting the engine.

7 Claims, 16 Drawing Sheets

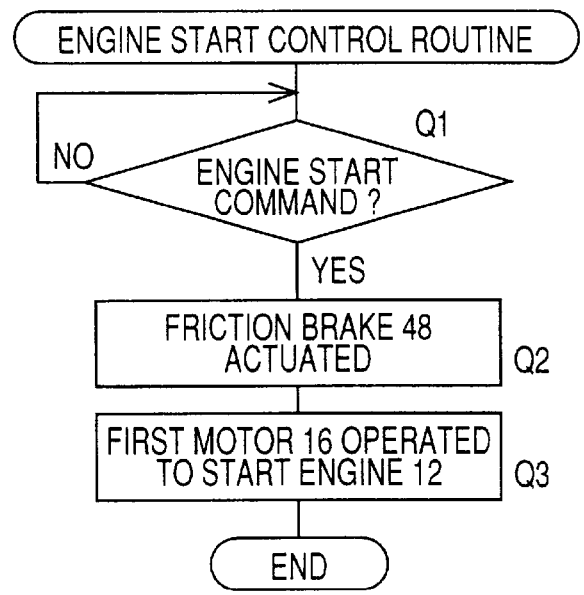
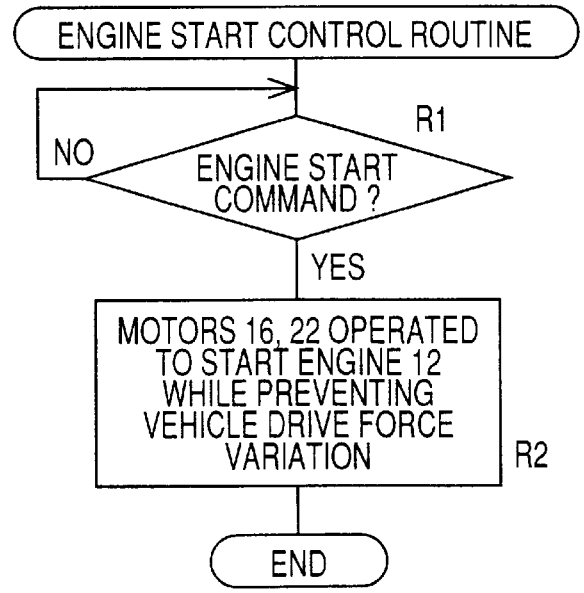

FIG. 11

| SHIFT LEVER POSITION | STATE OF M/G 16 | STATE OF M/G 22 | STARTER 102 |
|---|---|---|---|
| P | FREE (NON-LOAD) | MECHANICAL PARKING LOCK | ON |
| N (STOP) | FREE | FRICTION BRAKE ON | ON |
| N (RUN) | FREE | NO SPECIAL CONTROL (FREE) | ON |
| D (STOP) | FREE | NO SPECIAL CONTROL | ON |
| D (RUN) | FREE | NO SPECIAL CONTROL | ON |
| D (RUN) | MOTORING | NO SPECIAL CONTROL | OFF |

FIG. 14

| SHIFT LEVER POSITION | STATE OF M/G 16 | STATE OF M/G 22 | CLUTCH 112 |
|---|---|---|---|
| P, N | FORWARD ROTATION | FORWARD ROTATION | RELEASED |
| | FORWARD ROTATION | LOCKED | RELEASED |
| | LOCKED | FORWARD ROTATION | RELEASED |
| D | FORWARD ROTATION | NO SPECIAL CONTROL | ENGAGED |

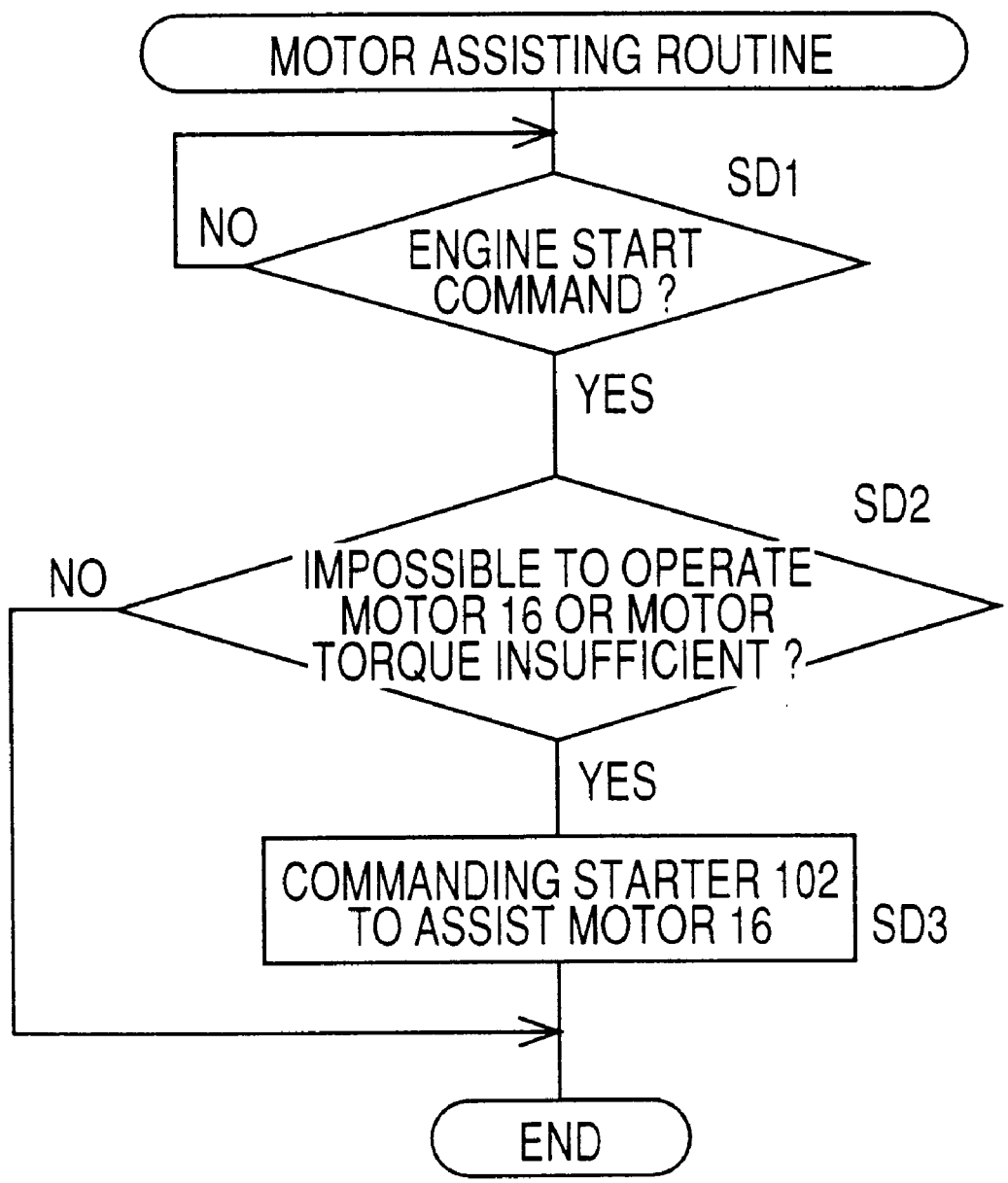

HYBRID VEHICLE DRIVE SYSTEM HAVING TWO MOTOR/GENERATOR UNITS AND ENGINE STARTING MEANS

BACKGROUND OF THE INVENTION

1. Field of the Invention

The present invention relates in general to a hybrid drive system for driving a motor vehicle, which has an engine and a motor/generator as drive power sources, and more particularly techniques for starting the engine.

2. Discussion of the Related Art

There is known a hybrid drive system for a motor vehicle, which includes (a) an engine operated by combustion of a fuel, (b) a first motor/generator, (c) a distributing mechanism for mechanically distributing an output of the engine to the first motor/generator and an output member, (d) a second motor/generator whose rotary force is transferred to a power transmitting path between the output member and a drive wheel of the motor vehicle. An example of such a hybrid drive system is disclosed in JP-A-50-30223, wherein the distributing mechanism consists of a planetary gear device, and the rotary force of the second motor/generator is transferred to the output member. In this hybrid drive system, the first motor/generator is used exclusively as an electric generator to charge an electric energy storage device such as a battery with an electric energy, while the second motor/generator is used exclusively as an electric motor for driving the vehicle, either alone or in cooperation with the engine. Generally, an electric generator may be used as an electric motor, while an electric motor may be used as an electric generator. In this sense, the term "motor/generator" is used herein.

The above-identified publication JP-A-50-30223 does not refer to a manner of starting the engine.

SUMMARY OF THE INVENTION

It is an object of the present invention to provide a hybrid vehicle drive system of mechanical distribution type which has an engine, a first motor/generator, a distributing mechanism and a second motor/generator, and which has engine starting means for suitably starting the engine.

The above object may be achieved according to a first aspect of this invention, which provides a hybrid drive system for a motor vehicle, comprising: (a) an engine operated by combustion of a fuel; (b) a first motor/generator; (c) a distributing mechanism for mechanically distributing an output of the engine to the first motor/generator and an output member operatively connected to a drive wheel of the motor vehicle; (d) a second motor/generator whose rotary force is transferred to a power transmitting path between the output member and the drive wheel; and (e) engine starting means for operating the first motor/generator to crank the engine through the distributing mechanism, for thereby starting the engine.

In the hybrid drive system constructed according to the first aspect of this invention, the engine is cranked by the first motor generator through the distributing mechanism, whereby the engine is started by the first motor/generator. The present hybrid drive system does not require an exclusive engine starter, and is accordingly available at a reduced cost owing to reduction in the number of the required components.

In the present hybrid drive system, an electrical energy storage device can be charged by the first motor/generator, which is operated as an electric generator by an output of the engine transferred thereto through the distributing mechanism. To start or fire the engine, the first motor/generator is operated as an electric motor to crank the engine through the distributing mechanism. However, the first motor/generator may be used as a drive power source for driving the vehicle. On the other hand, the second motor/generator is used primarily as an electric motor or a drive power source for driving the vehicle, either alone or in cooperation with the engine. The second motor/generator may be used as an electric generator for charging the electric energy storage device by regenerative braking, while applying a brake to the vehicle, like an engine brake.

The distributing mechanism is preferably a gear type mechanism having three rotary members, such as a planetary gear device or a bevel gear type differential gear device, and may include clutches as needed, for example, a clutch for selective connection and disconnection between the engine and the first motor/generator, and a clutch for selective connection and disconnection between two of the three rotary members. Where a planetary gear device having a sun gear, a carrier and a ring gear is used as the distributing mechanism, the sun gear, carrier and ring gear are connected to the appropriate ones of the engine, first motor/generator and output member. For instance, the carrier is connected to the engine, while the sun and ring gears are connected to the first motor/generator and the output member, respectively. A damper including an elastic member such as a spring or rubber member may be disposed between the engine and the distributing mechanism, for absorbing a variation in the rotary motion of the engine. An appropriate power transmitting mechanism such as a gear device may be disposed between the distributing mechanism and the engine, and/or between the distributing mechanism and the first motor/generator.

The second motor/generator is adapted to transfer its rotary motion or force to the power transmitting path between the output member and the vehicle drive wheel. A single second motor/generator may be provided for the output member. Alternatively, two or more second motor/generator units may be provided for a plurality of vehicle drive wheels, respectively. In this latter case, two or more assemblies each including the distributing mechanism, first motor/generator and second motor/generator are provided for respective vehicle drive wheels, while a single engine is provided for these assemblies. A clutch may be provided between the second motor/generator and the output member or any member operatively connected to the drive wheel.

According to one preferred form of the first aspect of the invention, the hybrid drive system further comprises drive force variation restricting means for restricting a variation in a vehicle drive force due to a reaction force which acts on the output member upon starting of the engine by the engine starting means.

When the engine is cranked by the first motor/generator through the distributing mechanism, a reaction force may act on the output member due to a resistance (e.g., frictional resistance) to rotation of the engine, or an output of the engine or first motor/generator (operating as the motor) may act on the output member immediately after starting or firing of the engine, whereby there may arise a variation in the drive force driving the vehicle, unexpectedly to the vehicle operator and passengers. In the light of this phenomenon, the drive force variation restricting means is provided according to the above preferred form of the hybrid drive system, for the purpose of at least restricting such possible variation of the vehicle drive force upon starting of the vehicle, which would otherwise give a discomfort to the vehicle operator and passengers.

In a first advantageous arrangement of the above preferred form of the hybrid drive system, the drive force variation restricting means comprises parking lock means for mechanically locking the drive wheel by manipulation of an operator's controlled operating member.

The parking lock means may include a parking brake which is operated by the operator's controlled operating member such as a parking brake lever, to mechanically lock the drive wheel of the vehicle. Where the hybrid drive system includes shift position selecting means such as a shift lever having a forward-drive position (D), a reverse-drive position (R), and a parking position (P), the parking lock means may include a mechanical parking lock mechanism which is adapted to mechanically lock the vehicle (hold the vehicle stationary) when the shift position selecting means is operated to the parking position. The drive force variation restricting means preferably include means for checking if the parking lock means is in the operated position for mechanically locking the vehicle, prior to an operation of the engine starting means, and means for prompting the vehicle operator to operate the parking lock means if the vehicle is not mechanically locked by the parking lock means.

In a second advantageous arrangement, the drive force variation restricting means comprises engine start motor control means for controlling the second motor/generator so as to offset the variation in the vehicle drive force upon starting of the engine by the engine starting means.

The engine start motor control means is adapted to control the torque (including regenerative braking torque) of the second motor/generator, so as to absorb or prevent a variation in the vehicle drive force, even when the output member is subjected to a reaction force due to a resistance (e.g., frictional resistance) to rotation of the engine, or due to an influence of an output of the engine or first motor/generator immediately after starting or firing of the engine. The engine start motor control means is capable of restricting the vehicle drive force variation even when the engine is started during running of the vehicle. For instance, the first motor/generator may be controlled by the engine start motor control means during running of the vehicle by the second motor/generator as a single drive power source. In this case, the first motor/generator placed in a non-load or free state is rotated in the reverse direction such that its regenerative braking torque is controlled by the engine start motor control means, or a torque applied to the first motor/generator in the forward direction is controlled by the engine start motor control means, whereby the engine can be cranked and started through the distributing mechanism. In this instance, a portion of the output of the second motor/generator is consumed by rotation of the engine. Therefore, the second motor/generator is operated to provide a total output which is larger than the power required for driving the vehicle, and the engine is driven by surplus power which is equal to the total output of the second motor/generator minus the required power for driving the vehicle. Thus, the engine start motor control means can restrict a possible variation in the vehicle drive force upon starting of the engine during running of the vehicle. The engine start motor control means may be desirably adapted to reduce the output of the second motor/generator when the output of the engine temporarily is transferred to the output member immediately after the starting or firing of the engine.

Thus, the engine start motor control means according to the second advantageous arrangement is adapted to operate the second motor/generator for offsetting or absorbing the drive force variation upon starting of the engine, and is effective not only when the vehicle is stationary, as in the above first advantageous arrangement (and in a third advantageous arrangement which will be described), but also when the vehicle is running. The engine start motor control means according to this second advantageous arrangement simply controls the second motor/generator to restrict the drive force variation, and does not require the vehicle operator to manipulate any operator's controlled operating member as required in the first advantageous arrangement using the parking lock means. Accordingly, the engine start motor control means reduces the operator's load upon starting of the engine, and the hybrid drive system is simpler in construction and more economical to manufacture than the hybrid drive system according to the third advantageous arrangement using the engine start braking means.

In a third advantageous arrangement, the drive force variation restricting means comprises engine start braking means for automatically mechanically braking the drive wheel prior to starting of the engine by the engine starting means.

The engine start braking means according to the above third advantageous arrangement is adapted to automatically brake the drive wheel of the vehicle upon starting of the engine. Thus, the vehicle operator's load is smaller in the present third advantageous arrangement than in the first advantageous arrangement which requires the vehicle operator to manipulate the operating member for operating the parking lock means. Further, the engine start braking means is simpler in its control and permits more stable locking of the vehicle drive wheel than the engine start motor control means adapted to control the second motor/generator. This engine start braking means is operable even when the electric energy stored in an electric energy storage device is insufficient (even when this insufficiently charged storage device is charged by the motor/generator by operation of the engine), or even when the hybrid drive system is placed in the neutral or parking position in which the second motor/generator cannot be used to restrict the vehicle drive force variation. Where the second motor/generator and the drive wheel are mechanically directly connected to each other, the hybrid drive system is generally adapted to inhibit, for safety, the operation of the second motor/generator (or hold the second motor/generator in the non-load or free state) when the drive system is placed in the neutral or parking position.

The engine start braking means may include a hydraulically operated or other wheel brake provided for a vehicle drive wheel or idler wheel, or a hydraulically operated or other friction brake provided in a power transmitting path terminating at the vehicle drive wheel. In this case, the engine start braking means includes a hydraulic circuit having a solenoid-operated switching valve or an electrically operated pump, and is adapted to control the switching valve or operate the pump for delivering a pressurized fluid to actuate the wheel brake or friction brake, prior to starting of the engine, for applying brake to the drive wheel and/or idler wheel of the vehicle to thereby hold the vehicle stationary. The engine start braking means may use any other type of brake adapted to produce a braking force. Where the vehicle is provided with a parking lock mechanism which is actuated to lock the vehicle when the hybrid drive system is placed in the parking position, it is desirable to actuate the engine start braking means to hold the vehicle stationary, when the engine is started while the drive system is placed in the drive position (forward-drive or reverse-drive position D, R) or the neutral position (NO).

According to a fourth advantageous arrangement of the above preferred form of the invention including the drive force variation restricting means, means is provided for inhibiting an operation of the drive force variation restricting means when a running speed of the motor vehicle is higher than a predetermined threshold.

In the above arrangement, the engine is started by the engine starting means without operation of the drive force variation restricting means when the vehicle speed is higher than the predetermined threshold. Although some variation in the vehicle drive force may arise due to a reaction force upon starting of the engine during running of the vehicle at a relatively high speed, an influence of this drive force variation is smaller than when the vehicle is stationary or running at a relatively low speed. That is, the degree of discomfort given to the vehicle operator by the drive force variation is comparatively small when the vehicle is running at a relatively high speed. The threshold of the vehicle speed is determined so that a variation in the vehicle drive force due to a reaction force upon starting of the engine during running of the vehicle will not give the vehicle operator a discomfort upon starting of the engine by the engine starting means.

The object indicated above may also be achieved according to a second aspect of this invention, which provides a hybrid drive system for a motor vehicle, comprising: (a) an engine operated by combustion of a fuel; (b) a first motor/generator; (c) a distributing mechanism for mechanically distributing an output of the engine to the first motor/generator and an output member operatively connected to a drive wheel of the motor vehicle; (d) a second motor/generator whose rotary force is transferred to a power transmitting path between the output member and the drive wheel; (e) an engine starter motor for starting the engine; and (f) engine starting means for operating the engine starter motor to crank the engine without a rotary motion being transferred to the distributing mechanism and while the first motor/generator is placed in a non-load state, for thereby starting the engine.

In the hybrid drive system constructed according to the second aspect of this invention, the engine is started by the engine starter motor, which is exclusively provided for starting the engine. When the engine is started, the first motor/generator is placed in the non-load state in which the first motor/generator is freely rotatable. When the engine is cranked by the engine starter motor, the first motor/generator is rotated, whereby the output member and the drive wheel are prevented from being subjected to a drive force. Accordingly, the present hybrid drive system is effective to prevent a possible variation in the vehicle drive force upon starting of the engine, and prevent a discomfort which would be otherwise given to the vehicle operator and passengers upon starting of the engine not only when the vehicle is running but also when the vehicle is stationary.

The engine starter motor is preferably adapted to be operated by an electric energy supplied from an electric energy storage device of low-voltage type (e.g., 12V) as generally provided on a common engine-driven vehicle. In this case, the electric energy storage device is desirably provided with external terminals for connection through a booster cable to an electric energy storage device on an engine-driven vehicle so that the insufficiently charged storage device of the hybrid drive system can be charged. Therefore, the engine starter motor can be operated to start the engine after the insufficiently charged storage device is sufficiently charged. Thus, the first motor/generator can be operated as the electric generator by the started engine, to charge an electric energy storage device of high-voltage type which is provided for operating the second motor/generator to drive the vehicle. The low-voltage storage device used for the engine starter motor may also be used as a power source for operating an air conditioner or other device optionally provided on the vehicle. Further, the low-voltage storage device may be adapted to be charged by the first motor/generator through a voltage converter device.

The engine starter motor need not be necessarily operated upon starting of the engine. That is, the engine starter may be operated only when the high-voltage storage device indicated above is insufficiently charged and cannot operate the first motor/generator. In this case, the engine is started by the engine starter motor while the first motor/generator is held in the non-load condition. The engine starter motor may be used as a secondary drive source for cranking the engine, as needed, namely, to assist the first motor/generator as needed for starting the engine.

The object indicated above may also be achieved according to a third aspect of this invention, which provides a hybrid drive system for a motor vehicle, comprising: (a) an engine operated by combustion of a fuel; (b) a first motor/generator; (c) a distributing mechanism for mechanically distributing an output of the engine to the first motor/generator and an output member operatively connected to a drive wheel of the motor vehicle; (d) a second motor/generator whose rotary force is transferred to a power transmitting path between the output member and the drive wheel of the motor vehicle; (d) a clutch disposed between the output member and the drive wheel and having an engaged position for connecting the output member to the drive wheel and a released position for disconnecting the drive wheel from the output member; and (e) engine starting means for operating at least one of the first motor/generator and the second motor/generator to crank the engine while the clutch is placed in the released position, for thereby starting the engine.

In the hybrid drive system constructed according to the third aspect of the invention, the engine is started by first releasing the clutch disposed between the output member and the vehicle drive wheel for disconnecting the output member from the drive wheel, and then operating at least one of the first motor/generator and the second motor/generator. Therefore, this hybrid drive system does not give the vehicle operator and passengers a discomfort due to a variation in the vehicle drive force upon starting of the engine, if the engine is started when the vehicle is stationary. During running of the vehicle, the engine is generally started with the clutch held in the engaged position, but may be started by temporarily releasing the clutch.

The hybrid drive system according to the third aspect of the invention may further comprise an engine starter motor for starting the engine, and motor assisting means for operating the engine starter to assist the first motor/generator and/or the second motor/generator to start the engine when the motor vehicle is in a predetermined condition, for instance, when the engine cannot be started by the first motor/generator and/or the second motor/generator.

BRIEF DESCRIPTION OF THE DRAWINGS

The above and optional objects, features, advantages and industrial and technical significance of the present invention will be better understood by reading the following detailed description of presently preferred embodiments of the invention, when considered in connection with the accompanying drawings, in which:

FIG. 6 is a flow chart illustrating an operation of the hybrid drive system of FIG. 5 to start an engine;

FIG. 7 is a flow chart illustrating an operation of a hybrid drive system to start an engine according to a third embodiment of the invention;

FIG. 11 is a view for explaining a relationship between the position of a shift lever, and the operating states of motor/generators and an engine starter, in starting an engine in the embodiment of FIG. 10;

FIG. 14 is a view for explaining a relationship between the shift lever position and the operating states of motor/generators and engine starter, in starting an engine in the embodiment of FIG. 13;

FIG. 17 is a flow chart illustrating an engine starting operation in the embodiment of FIG. 16.

DETAILED DESCRIPTION OF THE PREFERRED EMBODIMENTS

Figure 1:
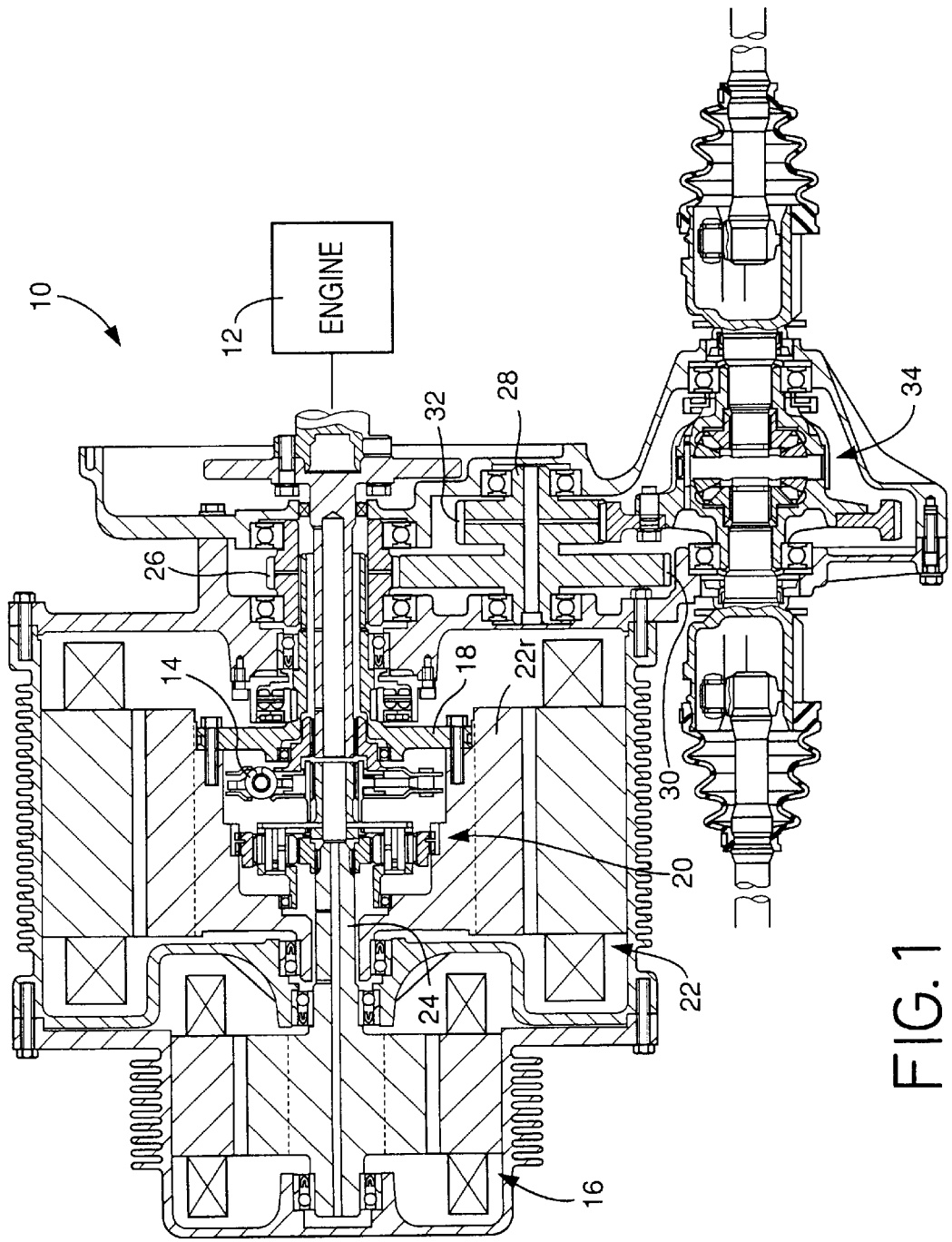
FIG. 1 is an elevational view in cross section of a hybrid drive system according to one embodiment of this invention.
Figure 2:
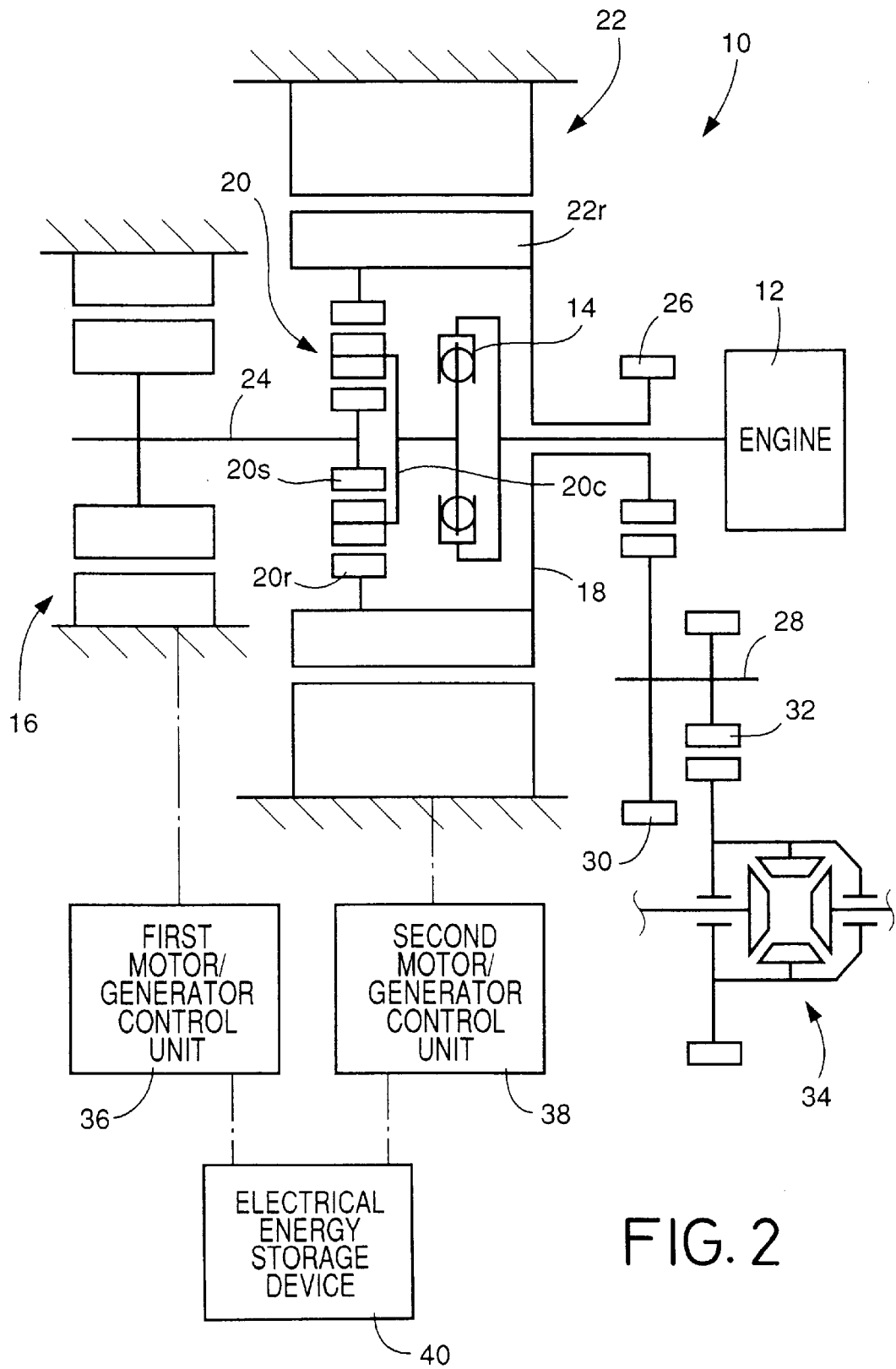
FIG. 2 is a schematic view illustrating the hybrid drive system of FIG. 1.

Referring first to the cross sectional view of FIG. 1 and the schematic view of FIG. 2, there is shown a hybrid drive system 10 for a motor vehicle, which is constructed according to a first embodiment of the present invention. The hybrid drive system 10 includes: an engine 12 such as an internal combustion engine, which is operated by combustion of a fuel; a damper 14 of spring type adapted to absorb a fluctuation in the rotary motion of the engine 12; a first motor/generator 16; an output member 18; a distributing mechanism 20 of planetary gear type which receives an output of the engine 12 through the damper 14 and which mechanically distributes the received engine output to the first motor/generator 16 and the output member 18; and a second motor/generator 22 whose rotary motion or force is transferred to the output member 18. The engine 12, damper 14, distributing mechanism 20 and first motor/generator 16 are disposed coaxially with each other and are arranged in the axial direction, while the second motor/generator 22 is disposed coaxially with and radially outwardly of the damper 14 and distributing mechanism 20.

The distributing mechanism 20 is a single pinion type planetary gear device which includes, as three rotary elements, a sun gear 20s connected to a motor shaft 24 of the first motor/generator 16, a carrier 20c connected to the damper 14, and a ring gear 20r connected to a rotor 22r of the second motor/generator 22. The output member 18 is bolted to the rotor 22r of the second motor/generator 22, for rotation with the rotor 22r, and is connected to the ring gear 20r of the distributing mechanism 20 through the rotor 22r. The output member 18 has an output gear 26. The output gear 26 is operatively connected to right and left drive wheels of the motor vehicle, through a large gear 30 and a small gear 32 mounted on an intermediate shaft 28, and a differential gear device 34 of bevel gear type, so that a rotary motion of the output shaft 18 is transferred to the drive wheels at a given speed reduction ratio.

The first motor/generator 16 and the second motor/generator 22 are electrically connected to an electric energy storage device 40 of high-voltage type (e.g., 288V) through a first motor/generator control unit (first M/G control unit) 36 and a second motor/generator control unit (second M/G control unit) 38, respectively. Each of these first and second motor/generators 16, 22 has a DRIVE state, a CHARGING state, and a NON-LOAD or FREE state, which are selectively established or selected. In the DRIVE state, the motor/generator 16, 22 is operated as an electric motor to provide a predetermined torque, with an electric energy being supplied thereto from the storage device 40. In the CHARGING state, the motor/generator 16, 22 is operated as an electric generator or dynamo, by regenerative braking (electrical braking torque of the motor/generator per se), so as to charge the storage device 40 with the electric energy. In the NON-LOAD or FREE state, the motor/generator 16, 22 is placed in a non-load condition permitting free rotation of the motor shaft 24 and rotor 22r. These motor/generators 16, 22 are controlled by the respective first and second M/G control units 36, 38, which in turn are controlled by a controller 42 as indicated in the block diagram of FIG. 3. The controller 42 also controls the engine 12, more specifically, the amount of fuel injection, throttle valve opening and ignition timing of the engine 12, to thereby control the operating condition of the engine 12 such as the operating speed and torque.

The controller 42 includes a microcomputer incorporating a central processing unit (CPU), a random-access memory (RAM) and a read-only memory (ROM). The controller 42 is adapted to perform data processing operations according to control programs stored in the ROM, so as to place the present hybrid drive system 10 in a selected one of operating modes which include: a MOTOR DRIVE mode in which only the second motor/generator 22 is operated as a drive power source to drive the vehicle while the first motor/generator 16 is placed in the NON-LOAD state; a CHARGING-ENGINE DRIVE mode in which only the engine 12 is operated as a drive power source to drive the vehicle while the first motor/generator is operated as an electric generator by the engine 12 to charge the electric energy storage device 40, with the second motor/generator 22 placed in its NON-LOAD state; an ENGINE-MOTOR DRIVE mode in which the engine 12 and the second motor/generator 22 are operated as drive power sources to drive the vehicle while the first motor/motor 16 is operated as an electric generator by the engine 12 and the second motor/generator 22 to charge the storage device 40; a REGENERATIVE BRAKING mode which is established during running of the vehicle in the MOTOR drive mode, and in which the second generator 22 is operated as an electric generator so as to apply a regenerative brake to the vehicle; and a CHARGING mode which is established while the vehicle is stationary and in which the first motor/ generator 16 is operated as an electric generator by the engine 12 to charge the storage device 40. The CHARGING mode is selected when the vehicle is parked or otherwise stationary. The controller 42 is adapted to execute an engine start control routine as illustrated in the flow chart of FIG. 4, as needed, in which the engine 12 is started by the first motor/generator 16, to place the hybrid drive system 10 in the CHARGING mode, for example.

Figure 3:
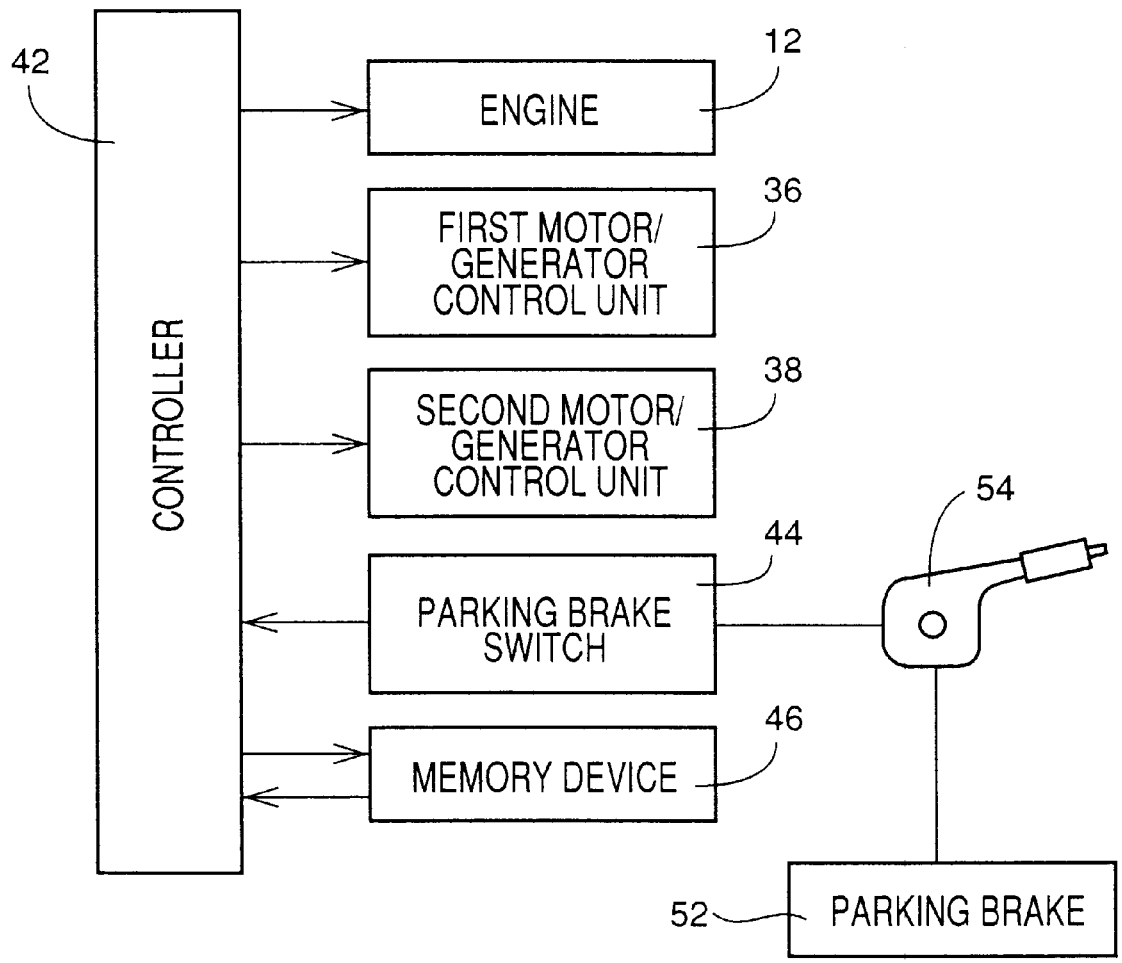
FIG. 3 is a block diagram indicating a control arrangement of the hybrid drive system of FIG. 1.
Figure 4:
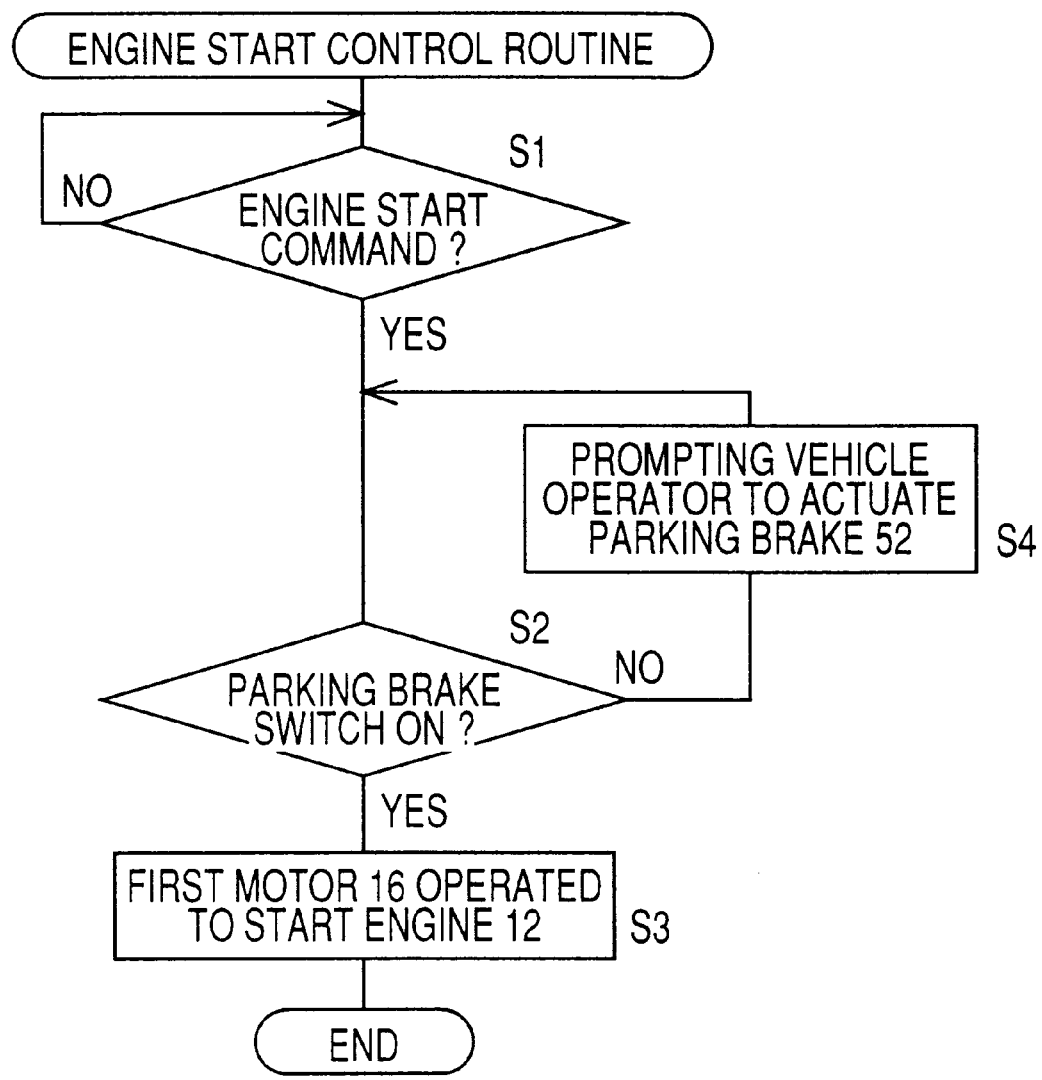
FIG. 4 is a flow chart illustrating an operation of the hybrid drive system of FIG. 1 to start an engine.

The engine start control routine illustrated in the flow chart of FIG. 4 is initiated with step S1 to determine whether an ENGINE START command is present. For instance, this ENGINE START command is generated when the vehicle operator desires to establish the CHARGING mode to charge the electric energy storage device 40 while the vehicle is held stationary. If an affirmative decision (YES) is obtained in step S1, the control flow goes to step S2 to determine whether a PARKING BRAKE switch 44 (FIG. 3) is ON. The PARKING BRAKE switch 44 is turned ON when a parking brake operating member 54 is in an operated position. As indicated in FIG. 3, the parking brake operating member 54 is operated to actuate a parking brake 52 provided for the vehicle wheels for applying parking brake to the vehicle. The switch 44 is arranged to be ON when the braking brake 52 is actuated. The parking brake 52 functions as drive force variation restricting means for restricting a variation in the vehicle drive force due to a reaction force acting on the output member 18 upon starting of the engine 12, more precisely, parking lock means for mechanically locking the vehicle wheels by manipulation of the parking brake operating member 54.

If the PARKING BRAKE switch 44 is OFF, that is, if a negative decision (NO) Is obtained in step S2, the control flow goes to step S4 to provide an indication prompting the vehicle operator to operate the parking brake operating member 54 to actuate the parking brake 52. Steps S2 and S4 are repeatedly implemented until an affirmative decision (YES) is obtained in step S2, that is, until the PARKING BRAKE switch 44 is turned ON (i.e., until the parking brake 52 is actuated). When the affirmative decision (YES) is obtained in step S2, the control flow goes to step S3 to operate the first motor/generator 16 for transferring a rotary motion to the engine 12 at rest through the distributing mechanism 20, to thereby start or fire the engine 12. When the PARKING BRAKE switch 44 is ON, that is, when the parking brake 52 is in the operated state, the ring gear 20r of the distributing mechanism 20 is prevented from rotating. In this state, an operation of the first motor/generator 16 in the forward direction will cause the engine 12 to be operated in the forward direction, more precisely, cause the crankshaft of the engine 12 to be rotated in the forward direction, at a speed determined by the gear ratio of the distributing mechanism 20, whereby the engine 12 is fired or started if the fuel injection and the ignition timing of the engine 12 are suitably controlled while the engine 12 is cranked by the first motor/generator 16. An optimum value of the torque or electric current of the first motor/generator 16 upon operation thereof to start the engine 12 is empirically determined by experimentation, so as to permit stable starting or firing of the engine 12, and is stored in a memory device 46 (FIG. 3), so that the first motor/generator 16 is suitably operated in step S3 to start the engine 12. It will be understood that a portion of the controller 42 assigned to implement step S3 of the routine of FIG. 4 constitutes engine starting means for starting the engine 12 by operation of the first motor/generator 16 to crank the engine 12 through the distributing mechanism 20.

As described above, the hybrid drive system 10 of the present first embodiment of the invention is adapted to start the engine 12 by operation of the first motor/generator 16, whereby an engine starter exclusively used for starting the engine 12 is not necessary. Accordingly, the number of the required components of the hybrid drive system 10 is reduced, and the cost of manufacture is accordingly reduced.

When the engine 12 is cranked by the first motor/generator 16 through the distributing mechanism 20, a reaction force may act on the output member 18 due to a resistance (e.g., frictional resistance) to the rotary motion of the engine 12, or the output of the started engine 12 or the output of the first motor/generator 16 may act on the output member 18, whereby there may arise a drive force to move the vehicle upon starting of the engine 12, unexpectedly to the vehicle operator and passengers. In the present hybrid drive device 10, however, the first motor/generator 16 is operated in step S3 only when the parking brake 52 is in the operated state. That is, the engine 12 is started by the first motor/generator 16 only when parking brake is applied to the vehicle, so as to prevent unexpected movement of the vehicle upon starting of the engine 12, which would give a discomfort to the vehicle operator and passengers.

In the illustrated first embodiment, the operation of the parking brake 52 is detected by the PARKING BRAKE switch 44 which is adapted to detect the operated position of the parking brake operating member 54 such as a parking brake lever. However, step S2 of the routine of FIG. 4 may be suitably modified, provided the step is formulated to determine whether parking brake is applied to the vehicle to hold the vehicle stationary. Where the motor vehicle has a shift lever or other shift position selecting means for placing the hybrid drive system 10 in a selected one of a plurality of positions including a parking position (P) and a drive position (D), the motor vehicle may be provided with a mechanical parking lock mechanism which is adapted to lock the power transmission system, more specifically, lock a parking lock gear provided in the power transmission path, when the shift position selecting means is operated to the parking position. In this case, the PARKING BRAKE switch 44 may be replaced by a detector adapted to detect the activation of the mechanical parking lock mechanism, namely, the operation of the shift position selecting means to the parking position.

Figure 5:
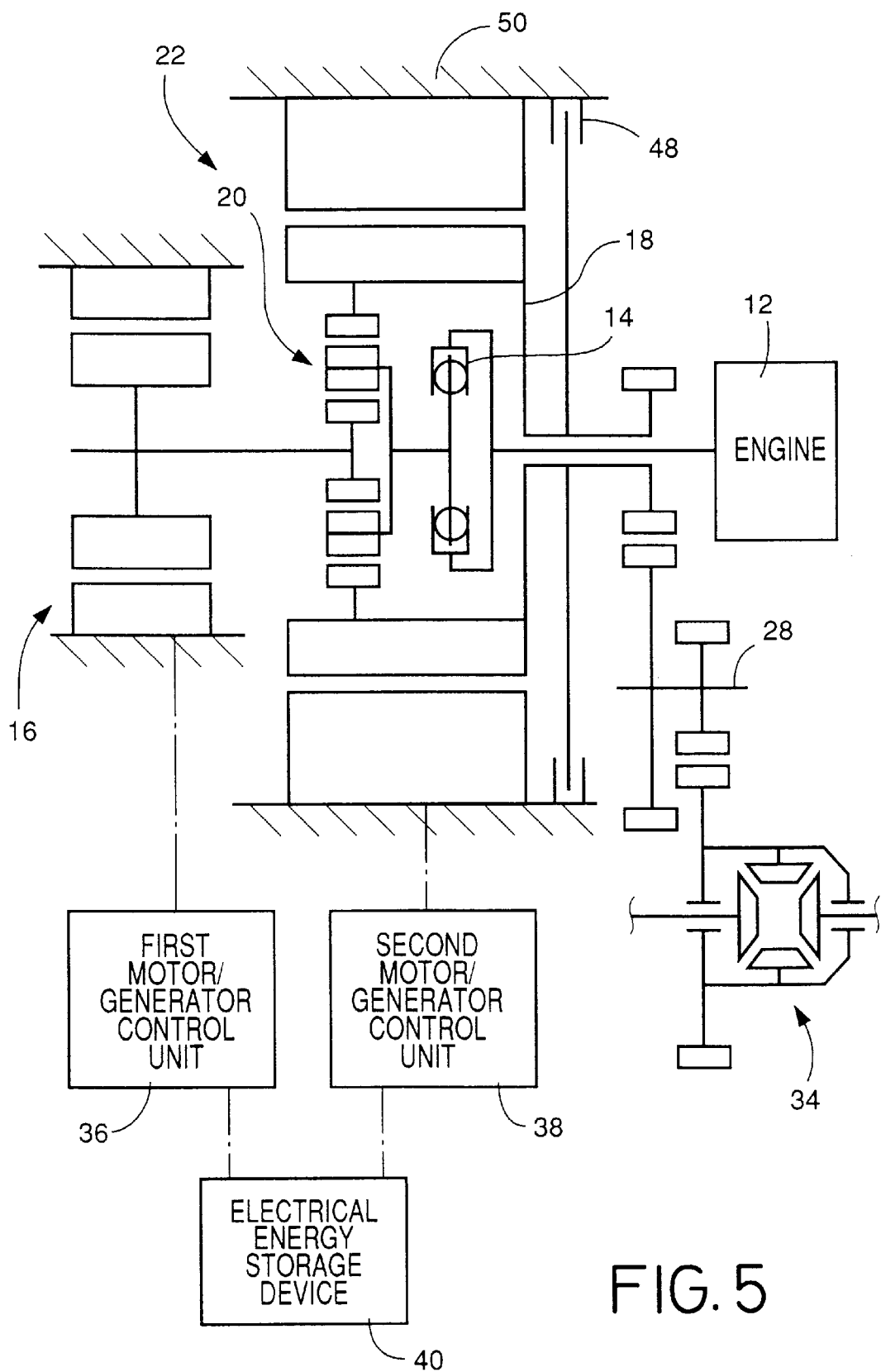
FIG. 5 is a schematic view corresponding to that of FIG. 2, illustrating a hybrid drive system according to a second embodiment of the invention.

The vehicle is held stationary as long as the ring gear 20r of the distributing mechanism 20 is locked or held stationary. For example, the ring gear 20r can be locked by using a hydraulically operated friction brake 48 of multiple-disk type as shown in FIG. 5, according to a second embodiment of this invention. The friction brake 48 is adapted to fix the output member 18 to a stationary housing 50 of the hybrid drive system 10. In this second embodiment, an engine start control routine illustrated in the flow chart of FIG. 6 is executed. This routine includes does not include a step of determining whether the vehicle is parked with the parking brake 52 in the operated position, but includes step Q2 in which the friction brake 48 is actuated to lock the output member 18 to thereby lock the ring gear 20r. Step Q2 is followed by step Q3 similar to step S3, to operate the first motor/generator 16 for starting the engine 12. This second embodiment of FIGS. 5 and 6 eliminates a need for the vehicle operator to actuate the parking brake 52 by operating the parking brake operating member 54, and thus reduces a load on the vehicle operator. This embodiment does not require controlling the second motor/generator 22 so as to hold the vehicle stationary upon starting the engine 12, as in a third embodiment of FIG. 7 which will be described. Accordingly, the engine start control according to the second embodiment of FIGS. 5 and 6 is simplified, and is available even when the second motor/generator 22 is inoperable due to shortage of the electric energy stored in the storage device 40 (which is therefore charged by starting the engine 12) or due to the shift position selecting means placed in the neutral position. In the hybrid drive system of the present second embodiment wherein the second motor/generator 22 is mechanically connected to the drive wheels, as indicated in FIG. 5, the second motor/generator 22 is inoperable or placed in the NON-LOAD state when the drive system is placed in the neutral or parking position.

It will be understood that a portion of the controller 42 assigned to implement step Q3 constitutes engine starting means for starting the engine 12 by operation of the first motor/generator 16 to crank the engine 12 through the distributing mechanism 20, while a portion of the controller 42 assigned to implement step Q2 and the friction brake 48 cooperate to constitute drive force variation restricting means for restricting a variation in the vehicle drive force upon starting of the engine 12, more specifically, engine start braking means for mechanically braking the vehicle wheels prior to starting of the engine 12.

The third embodiment of FIG. 7 indicated above does not use the friction brake 48, and the engine start control routine does not include a step of determining whether the vehicle is parked, but includes step R2 in which the torque values of the first motor/generator 16 and the second motor/generator 22 are controlled to prevent a movement of the vehicle upon starting of the engine 12. Described in detail, the engine 12 is cranked and started by operation of the first motor/generator 16, while the second motor/generator 22 is controlled to offset a drive force due to a reaction force generated by the operation of the first motor/generator 16 for thereby holding the vehicle stationary upon starting of the engine 12. The torque values or electric current values of the motors 16, 22, and the operation timing thereof are empirically determined by experimentation so as to permit stable starting or firing of the engine 12, and are stored in the memory device 46. This third embodiment of FIG. 7 adapted to start the engine 12 while holding the vehicle stationary by controlling the first and second motors 16, 22 does not require the vehicle operator to operate the parking brake operating member 54 and accordingly reduces a load on the vehicle operator, whereby the hybrid drive system is simplified and available at a reduced cost owing to the elimination of the friction brake 48.

It will be understood that a portion of the controller 42 assigned to implement a part of the step R2 assigned to control the first motor generator 16 constitutes the engine starting means, while a portion of the controller 42 assigned to implement a part of the step R2 assigned to control the second motor/generator 22 constitutes the drive force variation restricting means, more precisely, engine start motor control means for controlling the second motor/generator 22 so as to offset a drive force due to a reaction force generated by the operation of the first motor/generator 16 upon starting of the engine 12 by the engine starting means.

The third embodiment of FIG. 7 is capable of starting the engine 12 not only when the vehicle is held stationary, but also during running of the vehicle, for example, in the MOTOR DRIVE mode in which only the second motor/generator 22 is operated as the drive power source for driving the vehicle. In the MOTOR DRIVE mode, the engine 12 can be started through the distributing mechanism 20, by a regenerative braking torque generated by the first motor/generator during free rotation thereof in the reverse direction, by operating the first motor/generator 16 in the forward direction. In this case in which a part of the output of the second motor/generator 22 is consumed by the engine 12, the second motor/generator 22 is operated so as to produce an output which is larger than the power required to drive the vehicle, so that the engine 12 is cranked for starting by surplus power which is the output of the second motor/generator 22 minus the required power. By so controlling the second motor/generator 22, it is possible to absorb or prevent a vehicle drive force variation due to starting of the engine 12.

Figure 8:
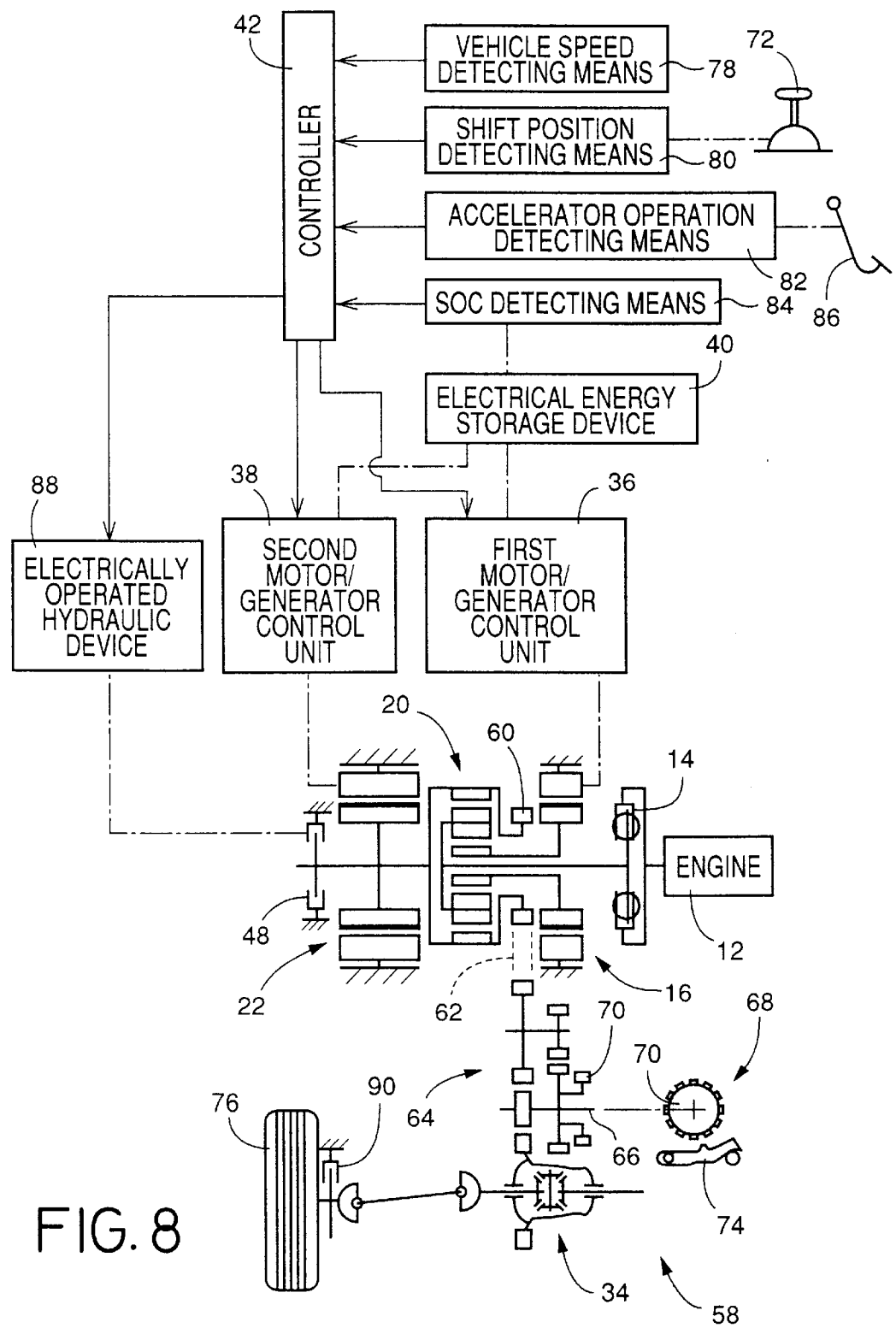
FIG. 8 is a schematic view illustrating a fourth embodiment of this invention.
Figure 9:
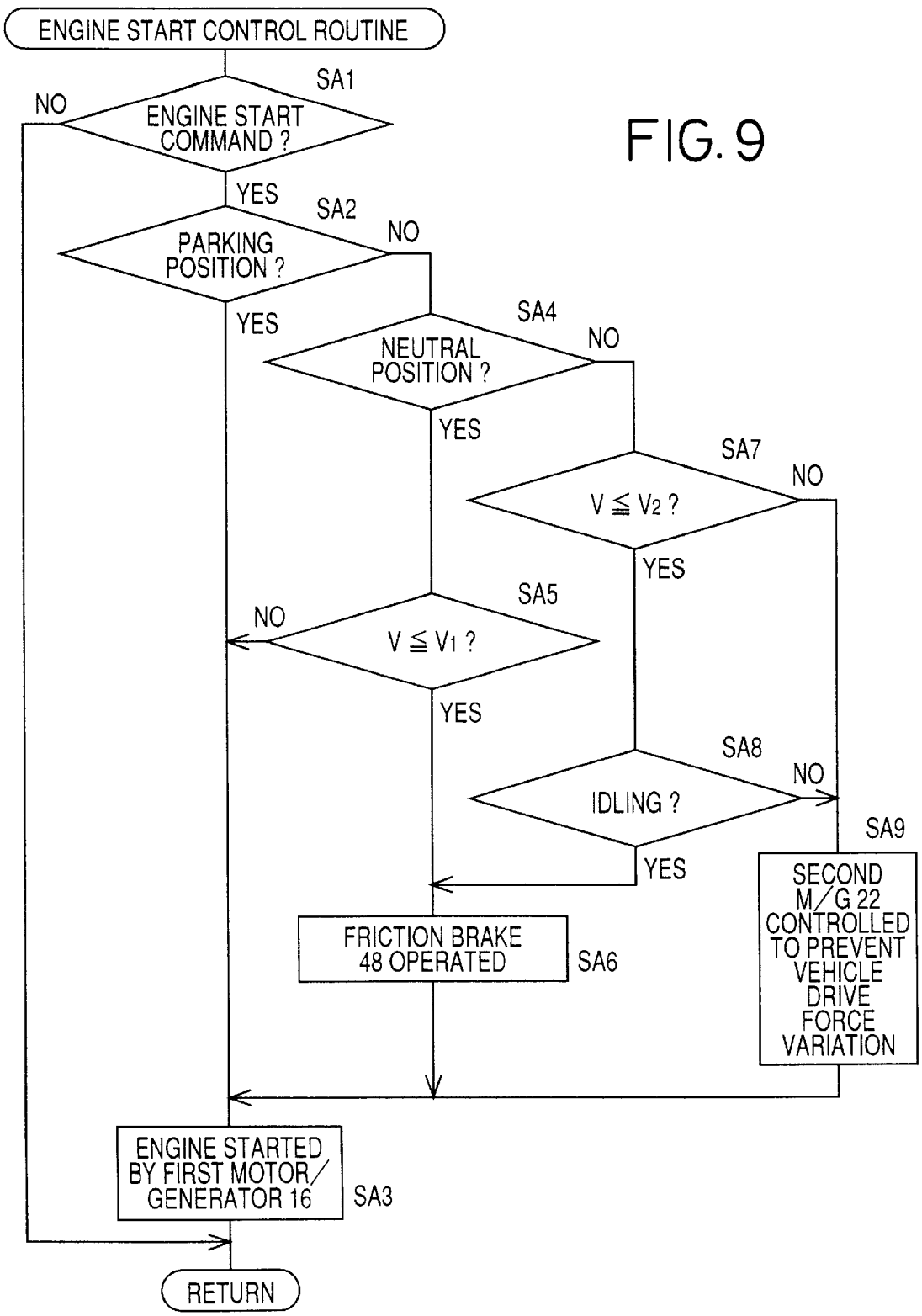
FIG. 9 is a flow chart illustrating an engine starting operation in the embodiment of FIG. 8.

Referring to FIGS. 8 and 9, there will be described a fourth embodiment of this invention in the form of a hybrid drive system 58 in which the engine 12, first motor/generator 16, distributing mechanism 20 and second motor/generator 22 are operatively connected to each other, as in the first embodiment of FIG. 2. However, the arrangement of these components in the hybrid drive system 58 is different from that in the hybrid drive system 10 of the first embodiment. Described more specifically, the first motor/generator 16 and the second motor/generator 22 are disposed on the axially opposite sides of the distributing mechanism 20, and the damper 14 and the engine 12 are disposed on one side of the first motor/generator 16 which is remote from the distributing mechanism 20. Between the distributing mechanism 20 and the first motor/generator 16, there is disposed a sprocket 60 integrally connected to the ring gear 20r. The sprocket 60 is connected to a speed reducer 64 through a chain 62. In his fourth embodiment, the sprocket 60 functions as an output member operatively connected to the vehicle drive wheels.

The speed reducer 64 is of parallel 2-axes type having a rotary shaft 66 which is provided with a parking lock gear 70 of a mechanical parking lock mechanism 68. When shift position selecting means in the form of a shift lever 72 is operated to a parking position (P), a parking lock pawl 74 of the parking lock mechanism 68 is brought into engagement with the parking lock gear 70, thereby locking the rotary shaft 66, and consequently locking the differential gear device 34 connected to the rotary shaft 66 through gears, whereby vehicle drive wheels 76 are locked. The parking lock pawl 74 is mechanically connected to the shift lever 72 through a cable and a link mechanism, so that a pivotal movement of the shift lever 72 causes a pivotal movement of the parking lock pawl 74 for engagement with the parking lock gear 70 connected to the rotary shaft 66 of the speed reducer 64.

The controller 42 receives output signals of vehicle speed detecting means 78, shift position detecting means 80, accelerator operation detecting means 82 and SOC detecting means 84. The output signals of the detecting means 78, 80, 82, 84 respectively represent a vehicle running speed V, a currently selected position of the shift lever 72 (of the hybrid drive system 58), an amount of operation of an accelerator pedal 86 and an amount of electric energy SOC stored in the electric energy storage device 40. The vehicle speed detecting means 78 may be adapted to detect the rotating speed of a selected rotary member such as the second motor/generator 22, which can be used to calculate the vehicle running speed V. The shift lever 72 has a plurality of operating positions including the above-indicated parking position (P), a forward-drive position (D), a reverse-drive position (R), and a neutral position (N) in which the hybrid drive system 58 does not provide a drive force in principle. The accelerator operation detecting means 82 generates an idling signal as well as the signal representative of the operation amount of the accelerator pedal 86 (which represents the output of the hybrid drive system 58 currently required by the vehicle operator). The idling signal is generated when the operation amount of the accelerator pedal 86 is zero, namely, when the hybrid drive system 58 is in an idling state.

As in the preceding embodiments, the controller 42 controls the motor/generator 16 and motor/generator 22 through the respective M/G control units 36, 38, so as to start the engine 12. The controller 42 also controls an electrically controlled hydraulic device 88 including an electrically operated pump, so as to control the hydraulically operated friction brake 48 so that the rotor 22r and the sprocket 60 are locked to hold the vehicle stationary when the friction brake 48 is engaged. The friction brake 48 may be provided on a suitable rotary member which rotates with the drive wheels 76 or idler wheels. For example, the friction brake 48 may be provided on the speed reducer 64. The friction brake 48 may be replaced by wheel brakes 90 generally provided for braking the drive wheels 76 or idler wheels of the vehicle.

Referring to the flow chart of FIG. 9, there will be explained an engine start control routine for starting the engine 12 under the control of the controller 42. This routine is initiated with step SA1 to determine whether the ENGINE START command is present. If an affirmative decision (YES) is obtained in step SA1, the control flow goes to step SA2 to determine whether the shift lever 72 is placed in the parking position (P). This determination is effected on the basis of the output signal of the shift position detecting means 80. If an affirmative decision (YES) is obtained in step SA2, the control flow goes to step SA3 similar to step S3, to operate the first motor/generator 16 for cranking and starting (firing) the engine 12. In this condition in which the mechanical parking lock mechanism 68 is actuated to lock the vehicle with the shift lever 72 placed in the parking position (P), the vehicle will not be moved by a drive force generated upon starting of the engine 12. It will be understood that a portion of the controller 42 assigned to implement step SA3 constitutes the engine starting means, while the mechanical parking lock mechanism 68 functions as the drive force variation restricting means, and more specifically, the parking lock means for mechanically locking the vehicle wheels.

If a negative decision (NO) is obtained in step SA2, the control flow goes to step SA4 to determine whether the shift lever 72 is placed in the neutral position (N). If an affirmative decision (YES) is obtained in step SA4, step SA5 is implemented to determine whether the vehicle running speed V is equal to or lower than a predetermined first threshold V1. This determination is effected based on the output signal of the vehicle speed detecting means 78. If an affirmative decision (YES) is obtained in step SA5, the control flow goes to step SA6 to actuate the hydraulic device 88 for delivering a pressurized working fluid to the friction brake 48 for engagement thereof. Then, step SA3 is implemented to start the engine 12. If a negative decision (NO) is obtained in step SA5, the control flow goes directly to step SA3 while skipping step SA6. The friction brake 48 may be relatively rapidly engaged in step SA6 if the vehicle speed V is substantially or close to zero. However, step SA6 is preferably formulated to slowly raise the pressure of the working fluid to be delivered to the friction brake 48 if the vehicle speed V is relatively high (if the vehicle is coasting at a relatively high speed with the shift lever 74 placed in the neutral position), so that the friction brake 48 is relatively slowly engaged to prevent a shock due to an abrupt brake by engagement of the friction brake 48.

When the shift lever 72 is placed in the neutral position (N), the second motor/generator cannot be operated to offset a drive force due to the operation of the first motor/generator 16 to start the engine 12. However, when the vehicle speed V is not higher than the predetermined first threshold V1, that is, when the vehicle is stationary or running at a sufficiently low speed, the friction brake 48 is engaged to stop the vehicle in step SA6, before the engine 12 is started in step SA3, so that the vehicle is prevented from moving by a drive force generated upon starting of the engine 12, unexpectedly to the vehicle operator. When the vehicle speed V is higher than the first threshold V1, that is, when the vehicle is coasting at a relatively high speed, the engine 12 is started during running of the vehicle. In this case, the vehicle drive force may vary upon starting of the engine 12, but the drive force variation during running of the vehicle will give a smaller degree of discomfort to the vehicle operator than when the vehicle is stationary or the vehicle speed V is considerably low (i.e., not higher than the first threshold V1). In other words, the first threshold V1 is determined to prevent or absorb a vehicle drive force variation due to starting of the engine 12 during running of the vehicle, which would give a considerable degree of discomfort to the vehicle operator. It will be understood that a portion of the controller 42 assigned to implement step SA6 constitutes the drive force variation restricting means, and more precisely, the engine start braking means, and that a portion of the controller 42 assigned to implement step SA5 constitutes inhibiting means for inhibiting an operation of the drive force variation restricting means when the vehicle speed is higher than a predetermined threshold.

If a negative decision (NO) is obtained in step SA4, that is, the shift lever 72 is placed in the forward-drive position (D) or reverse-drive position (R), the control flow goes to step SA7 to determine whether the vehicle speed V obtained from the output signal of the vehicle speed detecting means 78 is equal to or lower than a predetermined second threshold V2. If an affirmative decision (YES) is obtained in step SA7, step SA8 is implemented to determine whether the hybrid drive system 58 is placed in the idling state, that is, whether the operation amount of the accelerator pedal 86 represented by the output signal of the accelerator operation detecting means 82 is substantially zero. If the vehicle speed V is not higher than the second threshold V2 and the operation amount of the accelerator pedal 86 is substantially zero, the friction brake 48 is engaged in step SA6 before the engine 12 is started in step SA3. If the vehicle speed V is higher than the second threshold V2 or the accelerator pedal 86 is depressed, the control flow goes to step SA9 to operate the second motor/generator 22 so as to absorb or prevent a variation in the vehicle drive force due to the starting of the engine 12 in step SA3. It will be understood that a portion of the controller 42 assigned to implement step SA9 constitutes the drive force variation restricting means, more precisely, engine start motor control means for controlling the second motor/generator 22 so as to offset a drive force due to a reaction forge generated by the operation of the first motor/generator 16 upon starting of the engine 12. Step SA9 is implemented contemporaneously with step SA3, so that the first motor/generator 16 and the second motor/generator 22 are simultaneously controlled to start the engine 12 without a considerable vehicle drive force variation.

When the vehicle speed V is not higher than the predetermined second threshold V2, that is, when the vehicle is stationary or running at a low speed, and when the accelerator pedal 86 is not depressed, the vehicle is stopped by operation of the friction brake 48 in step SA6 before the engine 12 is started, so as to prevent a movement of the vehicle by a drive force generated upon starting of the engine 12, unexpectedly to the vehicle operator. When the vehicle speed V is higher than the second threshold V2, or when the accelerator pedal 86 is depressed, the engine 12 is started without operation of the friction brake 48, but the second motor/generator 22 is operated to absorb or prevent a vehicle drive force variation due to starting of the engine 12 by operation of the first motor/generator 16. Accordingly, the engine 12 can be started without giving a discomfort to the vehicle operator. The second threshold V2 may be lower than the first threshold V1.

Figure 10:
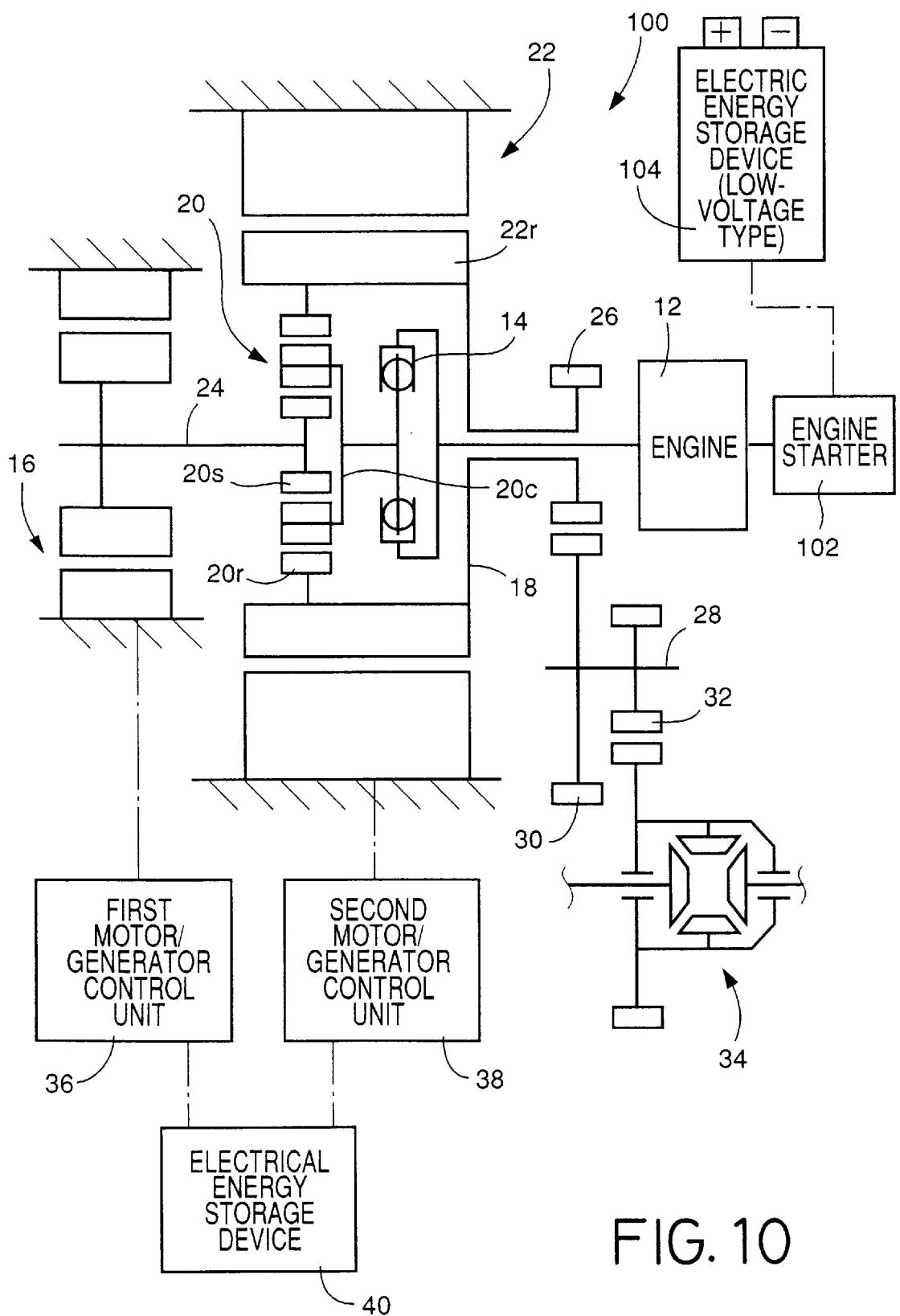
FIG. 10 is a schematic view illustrating a fifth embodiment of this invention.

There is shown in FIG. 10 a hybrid drive system 100 constructed according to a fifth embodiment of the present invention, which is provided with an engine starter motor 102 connected to a crankshaft of the engine 12, so that the engine 12 can be started by the engine starter motor 102, without a rotary motion being transferred to the engine 12 through the distributing mechanism 20. The engine starter motor 102 is powered by an electric energy storage device 104 of low-voltage type (e.g. 12V) generally provided on a common engine-driven vehicle as a power source for starting the engine. The storage device 104 has external terminals provided for easy connection through a booster cable to an electric energy storage device (battery) provided on a common engine-drive vehicle, when the electric energy stored in the storage device 104 is not sufficient for operating the engine starter motor 102 to start the engine 12. Since the engine 12 can thus be started by the motor starter motor 102, the high-voltage type electric energy storage device 40 can be charged by operation of the first motor/generator 16 by the engine 12, even when the storage device 104 is not initially sufficiently charged. If the high-voltage type storage device 40 is not charged enough to operate the first motor/generator 16 to start the engine 12, the storage device 40 cannot be charged by operation of the first motor/generator 16 by the engine 12 since the engine 12 cannot be started. In this case, the high-voltage storage device 40 should be charged by a special device for high-voltage application. The low-voltage storage device 104 is connected to the first motor/generator 16 and the high-voltage storage device 40 through a suitable voltage converter device, so that the electric energy may be supplied between the storage devices 40, 104. The storage device 104 may be used for an optionally provided device such as an air conditioner.

In the hybrid drive system 100, the engine 12 is started by the engine starter motor 102 while the first motor/generator 16 is placed in the NON-LOAD or FREE state. Thus, the engine 12 can be started without a vehicle drive force variation, at any time except when the first motor/generator 16 is in a motoring state in which the first motor/generator 16 is operated to prevent excessive rotation of the pinion of the distributing mechanism 20 during running of the vehicle in the forward-drive position (D). Table in FIG. 11 indicates operating states of the first motor/generator 16, second motor/generator 22 and engine starter motor 102 when the engine 12 is started in different running conditions of the vehicle with the shift lever placed in the parking, neutral and forward-drive positions (P, N, D). When the first motor/generator 16 is in the motoring state, the engine 12 is rotated by the motor 16, so that the engine 12 can be fired by injecting a fuel into the engine. In the Table of FIG. 11, an indication "NO SPECIAL CONTROL" of the second motor/generator 22 means that no special control of the second motor/generator 22 is required for starting the engine 12.

Referring to the flow chart of FIG. 12, an engine start control routine in the fifth embodiment of FIG. 10 will be described. The routine is initiated with step SB1 similar to step S1, to determine whether the ENGINE START command is present. If an affirmative decision (YES) is obtained in step SB1, the control flow goes to step SB2 to determine whether the first motor/generator 16 is in the motoring state. If an affirmative decision (YES) is obtained in step SB2, it means that the engine 12 is running without combustion of a fuel. In this case, the routine is terminated. If a negative decision (NO) is obtained in step SB2, that is, if the first motor/generator 16 is in the NON-LOAD or FREE state, the control flow goes to step SB3 to operate the engine starter motor 102 to crank and start the engine 12.

In the hybrid drive system 100, the engine 12 is started by the engine starter motor 102 while the first motor/generator 16 is in the NON-LOAD or FREE state, so that the first motor/generator 16 is rotated with a rotary motion of the engine 12, whereby a drive force will not be transferred to the output member 18 and the vehicle drive wheels. Thus, the engine 12 can be started by the engine starter motor 102, without a vehicle drive force variation unexpected to the vehicle operator, when the vehicle is running as well when the vehicle is stopped or parked.

It will be understood that a portion of the controller 42 assigned to implement step SB3 constitutes the engine starting means.

It is noted that the engine 12 can be started by using both the engine starter motor 102 and the first motor/generator 16. In this case, however, it is desirable to prevent a vehicle drive force variation by holding the vehicle stationary by actuating the parking brake 52, mechanical parking lock mechanism 68 or friction brake 48, as provided in the preceding embodiments, or by operating the second motor/generator 22 so as to prevent or absorb the vehicle drive force variation. The hybrid drive system 100 may be adapted to normally use predetermined one of the engine starter motor 102 and the first motor/generator 16, and to use the other alone or use both of the engine starter motor 102 and the first motor/generator 16 if the engine 12 cannot be started by the predetermined one of the engine starter motor 102 and the first motor/generator 16. Where the engine starter motor 102 is used only when the high-voltage storage device 40 is not sufficiently charged, the capacity and size of the engine starter motor 102 can be reduced for reducing the cost and the required installation space, provided that the engine starter motor 102 is able to start the engine 12, which is then used to operate the first motor/generator 16 for charging the storage device 40. The engine starter motor 102 can be operated by an electric energy supplied from another vehicle.

Figure 13:
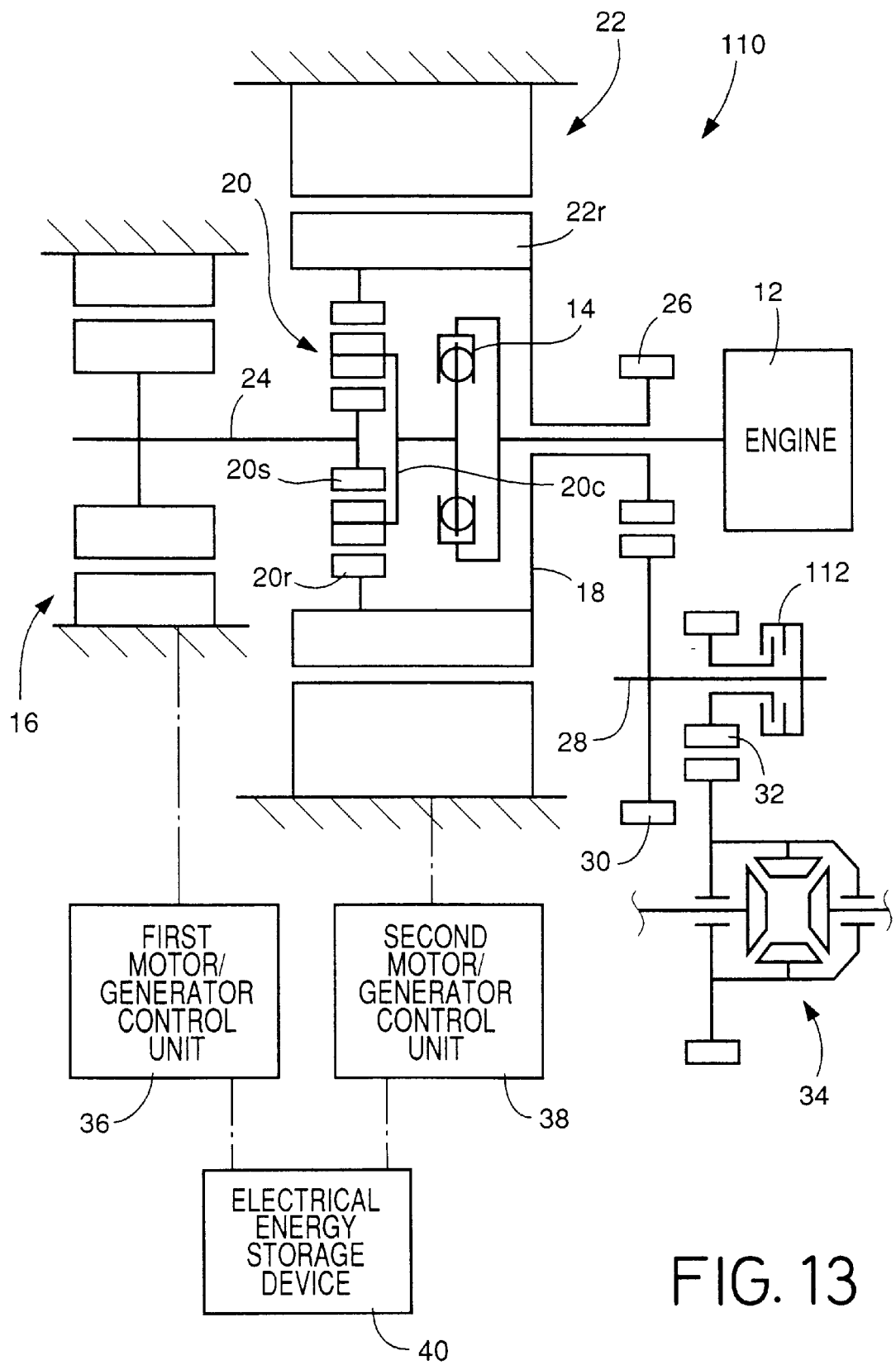
FIG. 13 is a schematic view illustrating a sixth embodiment of the invention.
Figure 15:
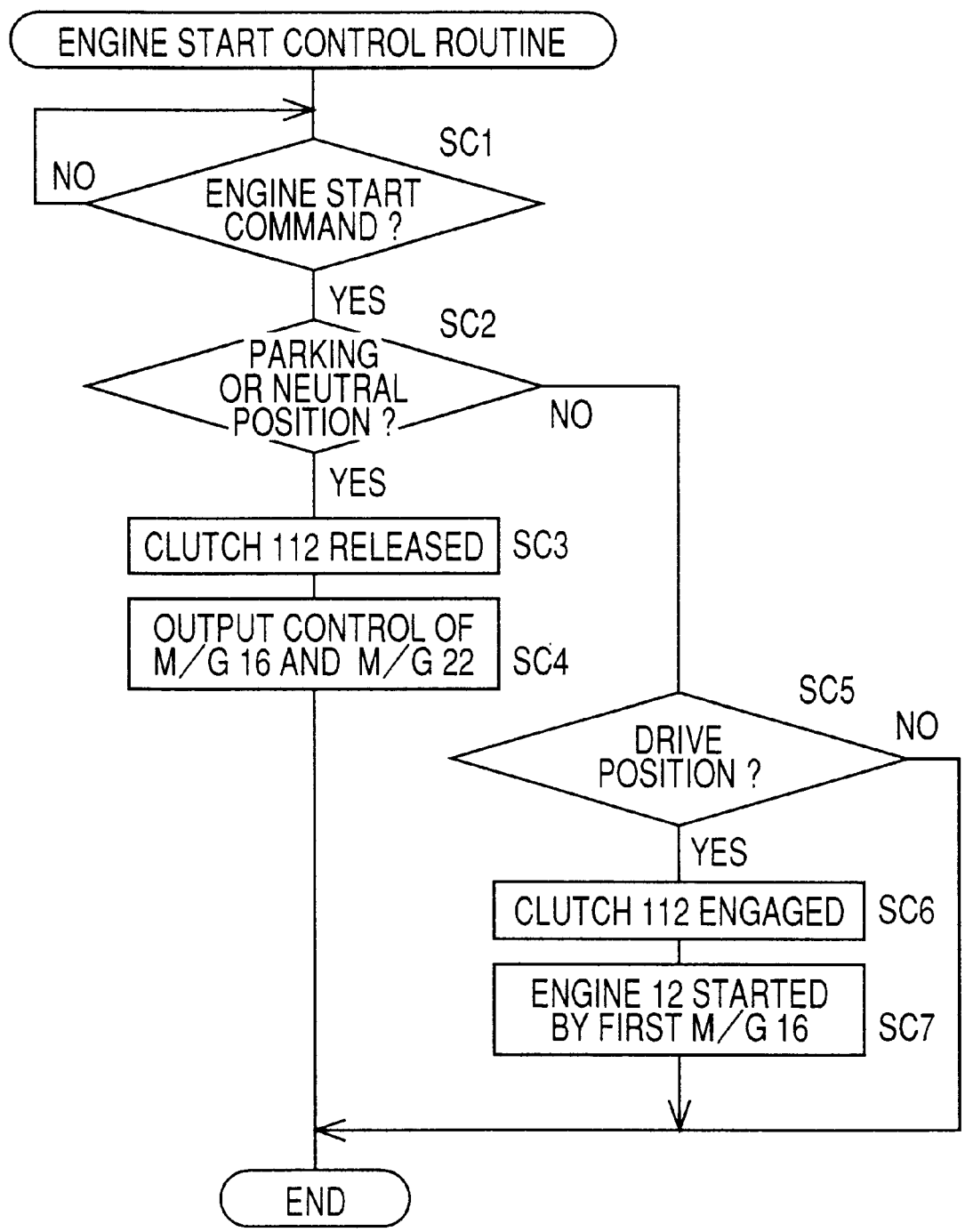
FIG. 15 is a flow chart illustrating an engine starting operation in the embodiment of FIG. 13.

Referring next to FIGS. 13–15, there will be described a hybrid drive system 110 according to a sixth embodiment of this invention. This hybrid drive system 110 is identical with the hybrid drive system of the second embodiments of FIGS. 5 and 6, except for a clutch 112 disposed between the intermediate shaft 28 and the small gear 32 for selective connection and disconnection therebetween. Table of FIG. 14 indicates the operating states of the first motor/generator 16, second motor/generator 22 and clutch 112 when the engine 12 is started in the different positions (P, N, D) of the shift lever. The engine 12 is started according to an engine start control routine illustrated in the flow chart of FIG. 15. In the present sixth embodiment wherein the clutch 112 is provided in the power transmitting path between the second motor/generator 22 and the drive wheels, the second motor/generator 22 is held in an active state even when the shift lever is placed in the parking or neutral position (P, N). Therefore, the torque of the second motor/generator 22 can be controlled by regulating the electric current, for example, even in the parking or neutral position (P, N), as in the forward-drive position (D).

The engine start control routine of FIG. 15 is initiated with step SC1 similar to step S1, to determine whether the ENGINE START command is present. If an affirmative decision (YES) is obtained in step SC1, the control flow goes to step SC2 to determine whether the shift lever is placed in the parking or neutral position (P, N). If an affirmative decision (YES) is obtained in step SC2, step SC3 is implemented to release the clutch 112 for disconnection of the power transmitting path, and then step SC4 is implemented to control the outputs of the first motor/generator 16 and the second motor/generator 22, for starting the engine 12. In this case, the first motor/generator 16 and the second motor/generator 22 are controlled in one of three modes as indicated in FIG. 14. In the first mode, the first motor/generator 16 and the second motor/generator 22 are both operated in the forward direction. In the second mode, the first motor/generator 16 is operated in the forward direction, while the second motor/generator 22 is controlled (e.g., by regenerative braking) to be locked. In the third mode, the second motor/generator 22 is operated in the forward direction, while the first motor/generator 16 is controlled (e.g., by regenerative braking) to be locked.

The vehicle is generally stationary with the shift lever placed in the neutral or parking position. In this case, the engine 12 is started by first releasing the clutch 112 to disconnect the power transmitting path, and then controlling the first motor/generator 16 and the second motor/generator 22, so that the engine 12 can be started without a vehicle drive force variation unexpected to the vehicle operator.

It will be understood that a portion of the controller 42 assigned to implement steps SC3 and SC4 constitutes the engine starting means.

If a negative decision (NO) is obtained in step SC2, the control flow goes to step SC5 to determine whether the shift lever is placed in the forward-drive position. If an affirmative decision (YES) is obtained in step SC5, step SC6 is implemented to engage the clutch 112 for connecting the power transmitting path, and step SC7 is then implemented to operate the first motor/generator 16 in the forward direction to start the engine 12. In this respect, it is noted that the forward rotation of the first motor/generator 16 is interpreted to include application of a forward torque or a regenerative braking torque to the first motor/generator 16 during reverse rotation thereof. Step SC7 may be modified to control the torque of the second motor/generator 22 so as to absorb a vehicle drive force variation upon starting of the engine 12, as in step SA9 in the fourth embodiment of FIGS. 8 and 9. The content of step SC7 may be changed depending upon whether the vehicle is stationary or running. Further, the engine 12 may be started with the clutch 112 placed in the released position, even when the shift lever is in the forward-drive position, as in the neutral or parking position.

The clutch 112 is preferably a hydraulically operated friction clutch. However, the clutch 112 may use an axially sliding member for connecting and disconnecting two gears. The clutch 112 may be disposed at any suitable position in the power transmitting path between the output member 18 and the vehicle drive wheels, for example, between the intermediate shaft 28 and the large gear 30, or between the output member 18 and the output gear 26.

Figure 16:
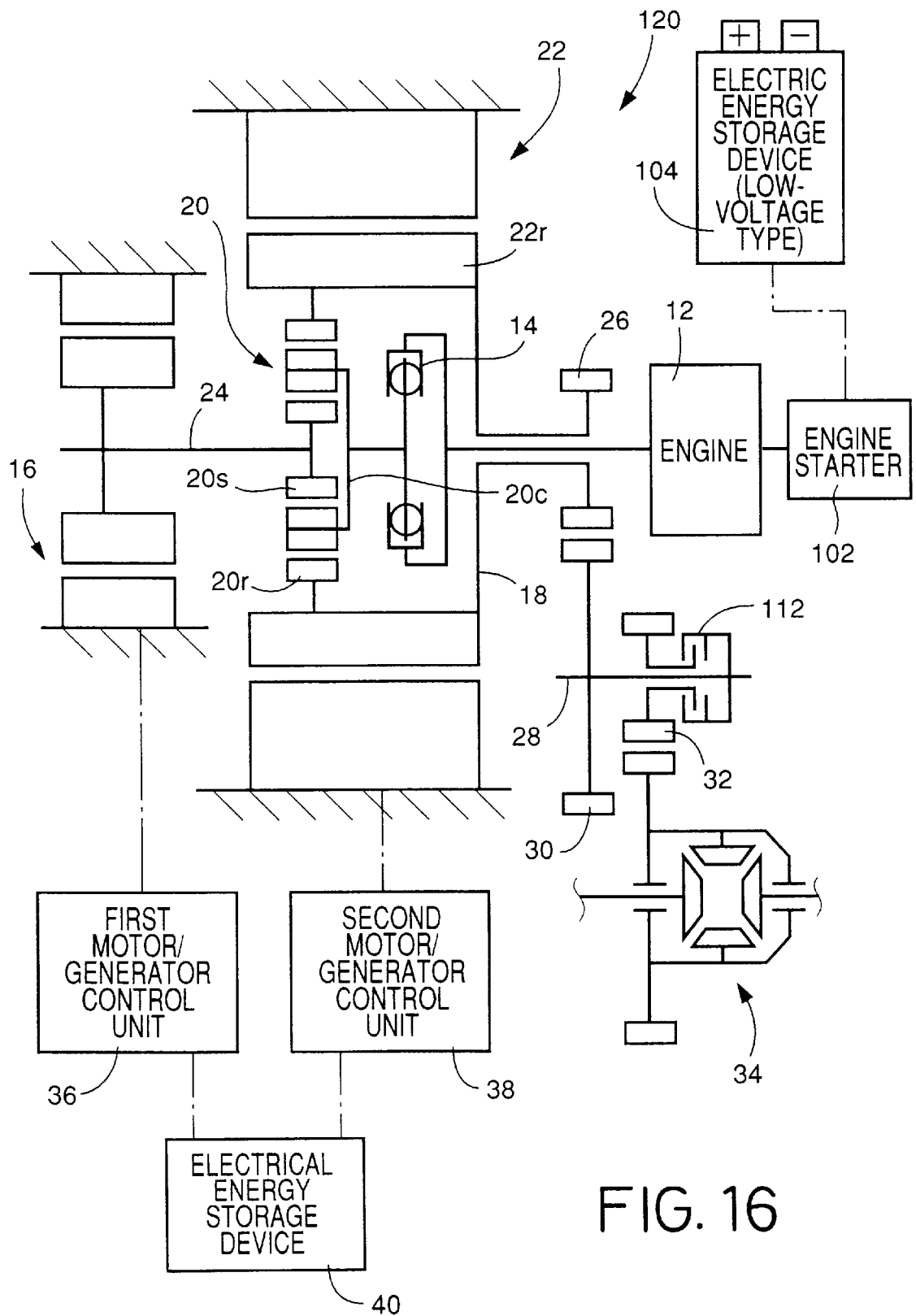
FIG. 16 is a schematic view illustrating a seventh embodiment of the invention.

A hybrid drive system 120 according to a seventh embodiment of the invention will be described by reference to FIGS. 16 and 17. The hybrid drive system 120 includes the engine starter motor 102 as provided in the hybrid drive system 100 of FIG. 10 and the clutch 112 as provided in the hybrid drive system 110 of FIG. 13. Where the engine starter motor 102 is used as an assisting motor, a motor assisting routine illustrated in the flow chart of FIG. 17 is executed prior to an engine start control routine, which is identical with the routine of FIG. 15 except for the elimination of step SC1. This motor assisting routine is initiated with step SD1 to determine whether the ENGINE START command is present. If an affirmative decision (YES) is obtained in step SD1, the control flow goes to step SD2 to determine whether the first motor/generator 16 cannot be operated due to insufficient electric energy stored in the storage device 40, or the torque of the motor/generator 16 is insufficient. If a negative decision (NO) is obtained in step SD2, the control flow goes directly to step SC2 of the engine start control routine. If an affirmative decision (YES) is obtained in step SD2, the control flow goes to step SD3 to generate a command to operate the engine starter motor 102 to assist the first motor/generator 16 in step SC4 or SC7.

It will be understood that a portion of the controller 42 assigned to implement steps SD2 and SD3 constitutes motor assisting means for operating the engine starter motor 102 to assist the motor/generator 16 and motor/generator 22 for starting the engine 12 when the vehicle is in a predetermined condition, namely, when the engine 12 cannot be started by the first motor first motor/generator 16.

Figure 12:
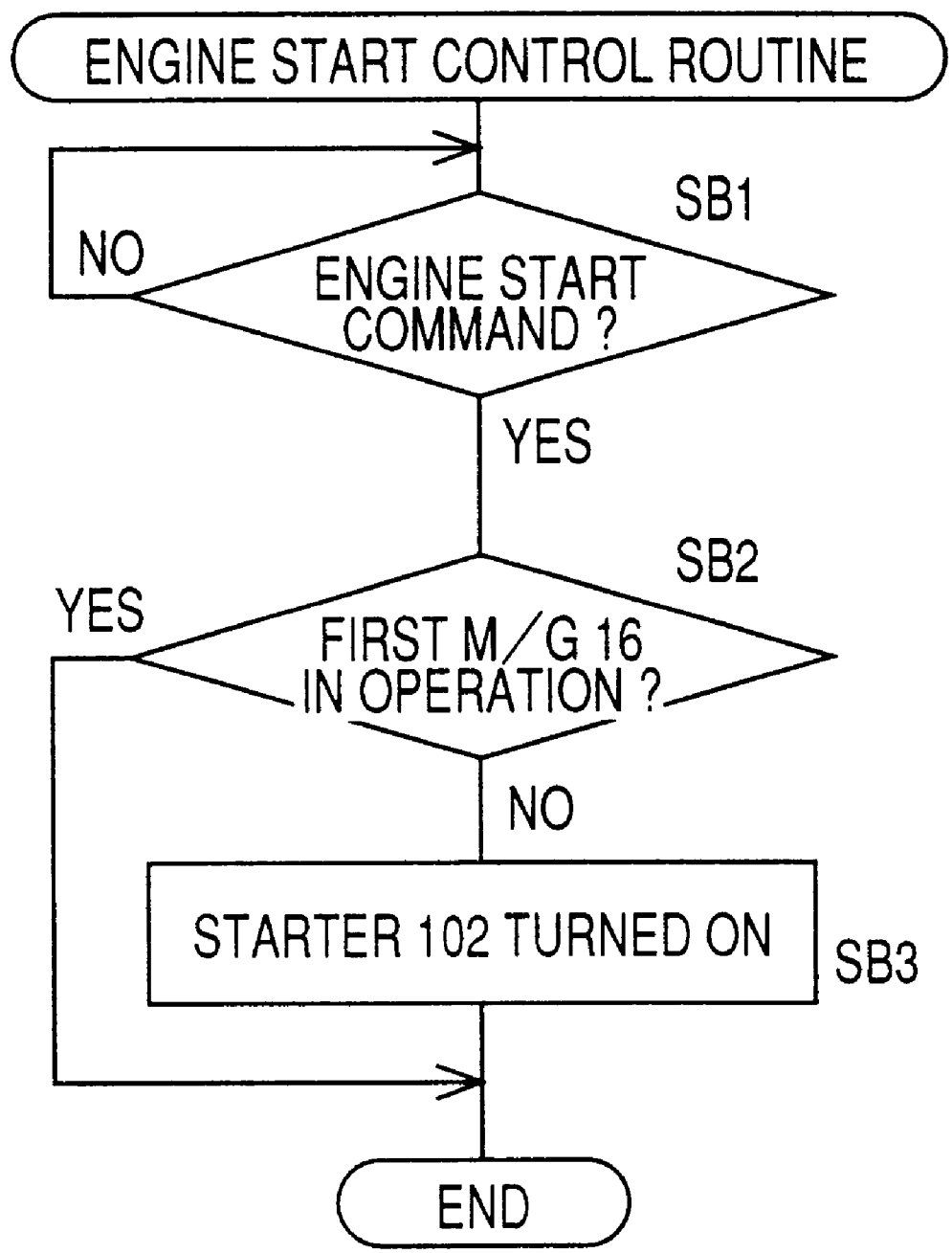
FIG. 12 is a flow chart illustrating an engine starting operation in the embodiment of FIG. 10.

The present seventh embodiment may be adapted to release the clutch 112 when the shift lever is placed in the neutral or parking position (N, P), and engage the clutch when the shift lever is placed in the forward-drive position (D), as in the sixth embodiment of FIGS. 13–15, and start the engine 12 by using the engine starter motor 102 except when the first motor/generator 16 is in the motoring state, as in the fifth embodiment of FIGS. 10–12. In the present seventh embodiment, too, the first motor/generator 16 and the second motor/generator 22 may be controlled as indicated in FIG. 11 or 14.

While the presently preferred embodiments of this invention have been described above by reference to the accompanying drawings for illustrative purpose only, it is to be understood that the invention is not limited to the details of the illustrated embodiments, but may be otherwise embodied.

While the hybrid drive systems of the illustrated embodiments use the intermediate shaft 28 and speed reducer 64 or only the speed reducer 64 for reducing the speed of the output member 18 or sprocket 50, the hybrid drive system according to the invention may include any other power transmitting mechanism or mechanisms, for example, a transmission having a plurality of speed rations, such as parallel two-axes type or planetary gear type transmission, or a continuously variable transmission such as a belt-and-pulley type transmission, and/or a forward-reverse switching mechanism having forward-drive and reverse-drive positions.

The arrangement of the engine 12, first motor/generator, distributing mechanism 20 and second motor/generator 22 may be modified as needed.

It is to be understood that the present invention may be embodied with various other changes, modifications and improvements which may occur to those skilled in the art, in the light of the foregoing teachings.

What is claimed is:

1. A hybrid drive system for a motor vehicle, comprising:
   an engine operated by combustion of a fuel;
   a first motor/generator;
   a distributing mechanism for mechanically distributing an output of the engine to the first motor/generator and an output member operatively connected to a drive wheel of the motor vehicle;

a second motor/generator whose rotary force is transferred to a power transmitting path between the output member and said drive wheel;

engine starting means for operating said first motor/generator to crank said engine through said distributing mechanism, for thereby starting said engine; and drive force variation restricting means for automatically restricting a variation in a vehicle drive force due to a reaction force which acts on said output member upon starting of said engine by said engine starting means;

wherein said drive force variation restricting means comprises engine start motor control means for controlling said second motor/generator so as to offset said variation in the vehicle drive force upon starting of said engine by said engine starting means.

2. A hybrid drive system for a motor vehicle, comprising:

an engine operated by combustion of a fuel;

a first motor/generator;

a distributing mechanism for mechanically distributing an output of the engine to the first motor/generator and an output member operatively connected to a drive wheel of the motor vehicle;

a second motor/generator whose rotary force is transferred to a power transmitting path between the output member and said drive wheel;

engine starting means for operating said first motor/generator to crank said engine through said distributing mechanism, for thereby starting said engine; and drive force variation restricting means for automatically restricting a variation in a vehicle drive force due to a reaction force which acts on said output member upon starting of said engine by said engine starting means;

wherein said drive force variation restricting means comprises engine start braking means for automatically mechanically braking said drive wheel prior to starting of said engine by said engine starting means.

3. A hybrid drive system for a motor vehicle, comprising:

an engine operated by combustion of a fuel;

a first motor/generator;

a distributing mechanism for mechanically distributing an output of the engine to the first motor/generator and an output member operatively connected to a drive wheel of the motor vehicle;

a second motor/generator whose rotary force is transferred to a power transmitting path between the output member and said drive wheel;

engine starting means for operating said first motor/generator to crank said engine through said distributing mechanism, for thereby starting said engine; and drive force variation restricting means for automatically restricting a variation in a vehicle drive force due to a reaction force which acts on said output member upon starting of said engine by said engine starting means;

wherein means is provided for inhibiting an operation of said drive force variation restricting means when a running speed of the motor vehicle is higher than a predetermined threshold.

4. A hybrid drive system for a motor vehicle, comprising:

an engine operated by combustion of a fuel;

a first motor/generator;

a distributing mechanism for mechanically distributing an output of the engine to the first motor/generator and an output member operatively connected to a drive wheel of the motor vehicle so that said drive wheel is driven by said output of the engine;

a second motor/generator whose rotary force is transferred to a power transmitting path between the output member and said drive wheel, so that said drive wheel is driven by said rotary force of said second motor/generator;

an engine starter motor for starting said engine; and engine starting means for operating said engine starter motor to crank said engine without a rotary motion being transferred to said distributing mechanism and while said first motor/generator is placed in a non-load state, for thereby starting said engine.

5. A hybrid drive system for a motor vehicle, comprising:

an engine operated by combustion of a fuel;

a first motor/generator;

a distributing mechanism for mechanically distributing an output of the engine to the first motor/generator and an output member operatively connected to a drive wheel of the motor vehicle;

a second motor/generator whose rotary force is transferred to a power transmitting path between the output member and said drive wheel of the motor vehicle;

a clutch disposed between said output member and said drive wheel and having an engaged position for connecting said output member to said drive wheel and a released position for disconnecting said drive wheel from said output member; and engine starting means for placing said clutch in said released position and for operating at least one of said first motor/generator and said second motor/generator to crank said engine while said clutch is placed in said released position, for thereby starting said engine.

6. A hybrid drive system for a motor vehicle, comprising:

an engine operated by combustion of a fuel;

a first motor/generator;

a distributing mechanism for mechanically distributing an output of the engine to the first motor/generator and an output member operatively connected to a drive wheel of the motor vehicle so that said drive wheel is driven by said output of the engine;

a second motor/generator whose rotary force is transferred to a power transmitting path between the output member and said drive wheel;

a clutch disposed between said output member and said drive wheel and having an engaged position for connecting said output member to said drive wheel and a released position for disconnecting said drive wheel from said output member;

engine starting means for placing said clutch in said released position and for operating an engine starter motor to crank said engine without a rotary motion being transferred to said distributing mechanism and while said first motor/generator is placed in a non-load state, for thereby starting said engine; and the engine starter motor for starting said engine, and motor assisting means for operating said engine starter motor to assist said at least one of said first motor/generator and said second motor/generator to start said engine when said at least one of said first motor/generator and said second motor/generator is in a predetermined condition.

7. A hybrid drive system according to claim 6, wherein said motor assisting means operates said engine starter motor when said engine cannot be started by said at least one of said first motor/generator and said second motor/generator.

* * * * *